(12) United States Patent  (10) Patent No.: US 8,059,290 B2
Kuroshima  (45) Date of Patent: Nov. 15, 2011

(54) INFORMATION PROCESSING APPARATUS FOR CONVERTING PRINT JOBS AMONG A PLURALITY OF PRINTING SYSTEMS, PRINT JOB CONVERSION METHOD, AND PROGRAM

(75) Inventor: Masashi Kuroshima, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1130 days.

(21) Appl. No.: 11/559,207

(22) Filed: Nov. 13, 2006

(65) Prior Publication Data

US 2007/0127064 A1 Jun. 7, 2007

(30) Foreign Application Priority Data

Dec. 2, 2005 (JP) ................................. 2005-348784

(51) Int. Cl.
G06F 3/12 (2006.01)
(52) U.S. Cl. ...................................... 358/1.15; 358/1.13
(58) Field of Classification Search .................. 358/1.15, 358/1.13
See application file for complete search history.

(56) References Cited

U.S. PATENT DOCUMENTS

| 5,905,852 | A | 5/1999 | Love et al. | |
| 5,995,723 | A * | 11/1999 | Sperry et al. | 358/1.15 |
| 7,102,778 | B2 * | 9/2006 | Parry | 358/1.15 |
| 2002/0016799 | A1 * | 2/2002 | Nakagiri et al. | 707/517 |
| 2003/0231341 | A1 * | 12/2003 | Aichi et al. | 358/1.15 |
| 2004/0064786 | A1 | 4/2004 | Ikeda et al. | |
| 2005/0030580 | A1 | 2/2005 | Moroi | |

FOREIGN PATENT DOCUMENTS

| EP | 0790548 A1 | 8/1997 |
| EP | 1197842 A2 | 4/2002 |
| EP | 1498839 A2 | 1/2005 |
| JP | 09-330187 A | 12/1997 |
| JP | 2002-202862 A | 7/2002 |
| JP | 2004-164570 A | 6/2004 |
| JP | 2005-047264 A | 2/2005 |

* cited by examiner

*Primary Examiner* — Benny Tieu
*Assistant Examiner* — Sunil Chacko
(74) *Attorney, Agent, or Firm* — Canon USA Inc IP Division

(57) ABSTRACT

To improve work efficiency and reduce work costs, automatic transmission/reception and conversion of a print job can be performed (without requiring manual work) among plural printing systems having different functions. An information processing apparatus, connected to plural printing systems, can create a job ticket for a second system based on a job ticket and content data for a first system and device function information for the second system.

6 Claims, 30 Drawing Sheets

FIG.18

[JOB PROCESSING METADATA STRUCTURE] — 160

| | | | |
|---|---|---|---|
| | JOB PROCESSING METADATA | | |
| 161 — PREPRESS | IMPOSITION INFORMATION | · N-UP NUMBER<br>· PAGE LAYOUT ORDER | 165 |
| | SADDLE STITCH BOOKBINDING INFORMATION | · SADDLE STITCH BOOKBINDING EXECUTION ON/OFF<br>· CREEP VALUE | 166 |
| 162 — PRESS | RIP INFORMATION | · SCREENING METHOD | 167 |
| | MEDIA INFORMATION | · MEDIA SIZE<br>· MEDIA TYPE | 168 |
| 163 — POSTPRESS | STITCH INFORMATION | · STITCH PROCESSING EXECUTION & STITCH POSITION | 169 |
| | CUTTING INFORMATION | · CUTTING INFORMATION & CUTTING POSITION | 16a |
| 164 — COMMON INFORMATION | FILE INFORMATION | · PDF FILE PATH | 16b |

FIG.19
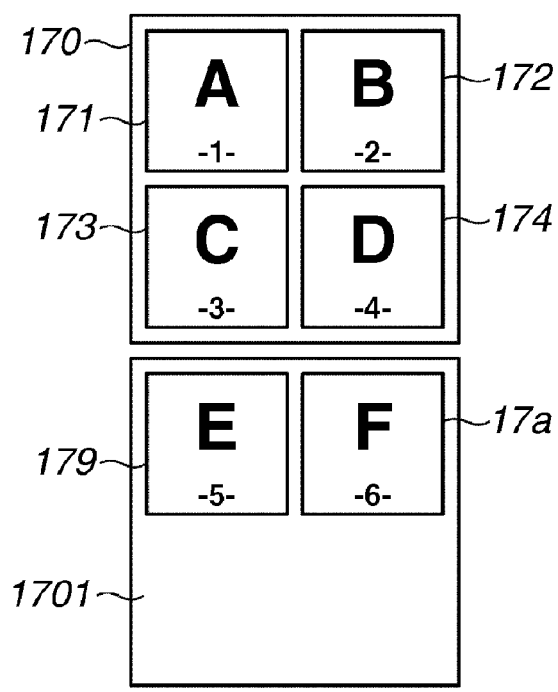
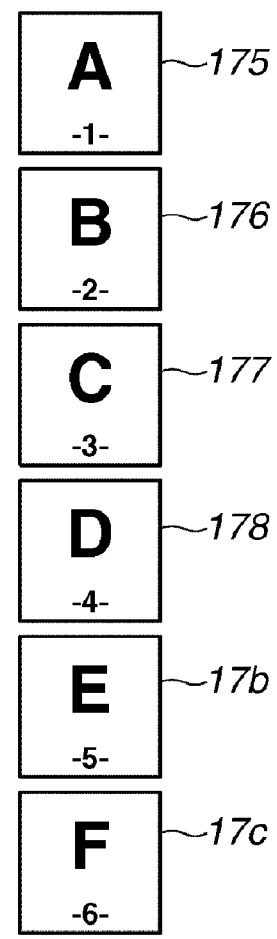

FIG.24
FIRST PAGE
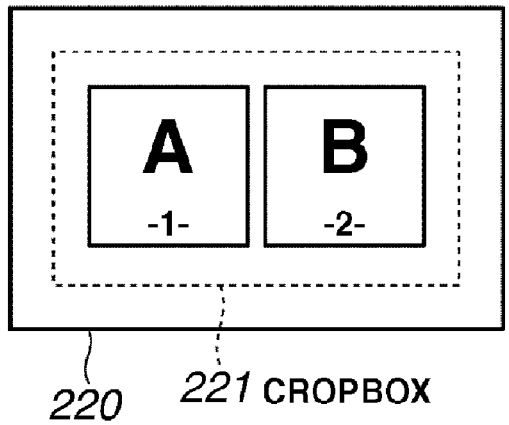
220  221 CROPBOX
SECOND PAGE
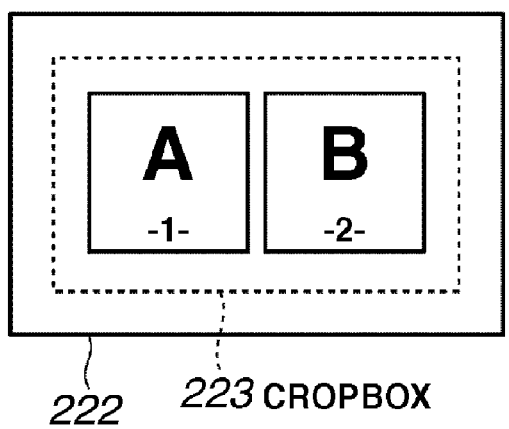
222  223 CROPBOX
THIRD PAGE
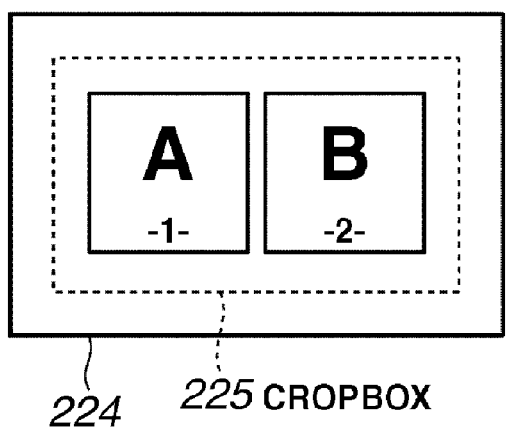
224  225 CROPBOX

FIG.34

STORAGE MEDIUM (FD/CD-ROM)

| DIRECTORY INFORMATION |
|---|
| FIRST PROCESSING PROGRAM<br>PROGRAM CODE GROUP CORRESPONDING TO<br>FLOWCHART STEPS IN FIG. 15 |
| SECOND PROCESSING PROGRAM<br>PROGRAM CODE GROUP CORRESPONDING TO<br>FLOWCHART STEPS IN FIG. 16 |
| THIRD PROCESSING PROGRAM<br>PROGRAM CODE GROUP CORRESPONDING TO<br>FLOWCHART STEPS IN FIG. 20 |
| FOURTH PROCESSING PROGRAM<br>PROGRAM CODE GROUP CORRESPONDING TO<br>FLOWCHART STEPS IN FIG. 21 |
| FIFTH PROCESSING PROGRAM<br>PROGRAM CODE GROUP CORRESPONDING TO<br>FLOWCHART STEPS IN FIG. 23 |
| SIXTH PROCESSING PROGRAM<br>PROGRAM CODE GROUP CORRESPONDING TO<br>FLOWCHART STEPS IN FIG. 25 |
| SEVENTH PROCESSING PROGRAM<br>PROGRAM CODE GROUP CORRESPONDING TO<br>FLOWCHART STEPS IN FIG. 26 |
| EIGHTH PROCESSING PROGRAM<br>PROGRAM CODE GROUP CORRESPONDING TO<br>FLOWCHART STEPS IN FIG. 30 |
| NINTH PROCESSING PROGRAM<br>PROGRAM CODE GROUP CORRESPONDING TO<br>FLOWCHART STEPS IN FIG. 31 |
| TENTH PROCESSING PROGRAM<br>PROGRAM CODE GROUP CORRESPONDING TO<br>FLOWCHART STEPS S74-S78 IN FIG. 32 |

MEMORY MAP OF STORAGE MEDIUM

INFORMATION PROCESSING APPARATUS FOR CONVERTING PRINT JOBS AMONG A PLURALITY OF PRINTING SYSTEMS, PRINT JOB CONVERSION METHOD, AND PROGRAM

BACKGROUND OF THE INVENTION

1. Field of the Invention

The present invention relates to a print job conversion control for an information processing apparatus configured to perform conversion of a print job among plural printing systems having different functions.

2. Description of the Related Art

The commercial printing industries are based on a print-ordering system capable of receiving, from clients, print requests for various products (e.g., magazines, newspapers, catalogs, advertisements, and gravures), creating printed products requested by the clients, and delivering the printed products to respective clients.

This kind of commercial printing industries generally uses large-scale printing apparatuses, such as offset printing machines, to perform various processes including document entry, design and/or layout, comprehensive layout (print output for presentation), correction (layout correction and color correction), proof print, camera-ready block copy creation process, printing process, post-processing process, and delivery.

On the other hand, highly-advanced technologies of recent electrophotographic printing apparatuses and inkjet printing apparatuses can realize a print on demand (hereinafter, referred to as POD) market comparable to the printing service provided by the conventional printing industries.

The POD system is useful in processing a relatively small lot of job in a short period of time without using large-scale apparatuses and systems. The POD system can utilize best performances of digital image forming apparatuses, such as digital copying machines and digital multifunction peripherals, to obtain a digital print of electronic data, which cannot be realized by the above-described conventional printing system using large-scale printing machines or printing methods.

According to the POD system, management and control of printing processes can be greatly digitized and computerized compared to the conventional printing system.

Furthermore, the POD system can use a workflow including plural processing processes (e.g., pre-print process, print process, and post-print process) required for outputting a print result. The printing system can execute the print processing according to the workflow and can efficiently obtain a print result requested by a client (orderer).

A technique for automatically creating a workflow including plural processing process is, for example, discussed in Japanese Patent Application Laid-open No. 2004-164570. According to a method for automatically creating a workflow discussed in Japanese Patent Application Laid-open No. 2004-164570, a workflow creation apparatus holds environment information (e.g., output conditions including attribute values of a final output product, workflow creation rules stored beforehand, presence of processing modules, and designation of computers that can execute respective processing modules). Then, based on the environment information, the workflow creation apparatus automatically creates a workflow for obtaining a final output product.

However, according to the above-mentioned Japanese Patent Application Laid-open No. 2004-164570, no consideration is given to print data created for a different printing system although the workflow required to obtain a final output product can be automatically created. As an example of print data, the print data may include portable document format data (PDF) (content data) and print instruction data (job ticket).

For example, creation of PDF for a system A is generally optimized by performing down-sampling suitable for the resolution of a printing device in the system A. Therefore, if a digital print section in a system B is different in resolution from a digital print section in the system A, the digital print section of the system B cannot execute optimum print processing for PDF transferred from the system A. Accordingly, if the PDF transferred from the system A is processed by the digital print section in the system B, the print quality will be deteriorated.

Furthermore, a printing device in the system A and a printing device in the system B may have different printable regions even if they can print the same regular size (A4/A3) documents. For example, a printing device in the system B may require a larger printing margin compared to that of a printing device in the system A. In such a case, if PDF created by a prepress section in the system A is processed by the printing device in the system B, the peripheral region of an image may not be printed properly due to the difference of printing margin.

As described above, various problems arise when print data created for a particular printing system is processed by another printing system. An output result requested by a client may not be obtained. It is, however, difficult and time consuming for a worker to carefully check function information of devices and print data processed in both systems and rearrange the print data to smoothly execute the print processing.

SUMMARY OF THE INVENTION

Exemplary embodiments of the present invention are directed to a technique for automatically performing transmission/reception and conversion of a print job among plural printing systems having different functions and providing a mechanism capable of improving the entire work efficiency.

According to an aspect of the present invention, at least one exemplary embodiment provides an information processing apparatus configured to communicate with a first printing system and a second printing system. The information processing apparatus includes: a reception unit configured to receive, from the first printing system, work instruction data for the first printing system created based on print request instruction contents and original content data entered in the first printing system, and first content data created for the first printing system; a first acquiring unit configured to obtain device function information in the second printing system; and a first generation unit configured to create work instruction data for the second printing system based on the work instruction data for the first printing system received from the first printing system, the content data for the first printing system, and the device function information in the second printing system.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 18 illustrates a practical structure of job processing metadata created in the job portal processing section shown in FIG. 14.

FIG. 19 illustrates a page layout of PDF transmitted from the system A shown in FIG. 14 and a page layout of original PDF.

FIG. 24 illustrates a page layout of PDF transmitted from the system A and cropbox information representing a drawing region of a content object on each page of the PDF.

FIG. 34 illustrates a memory map of a storage medium (recording medium) storing various data processing programs which are executable in the job portal processing section (information processing apparatus) of the integrated printing system in accordance with an exemplary embodiment.

DESCRIPTION OF THE EMBODIMENTS

Figure 1:
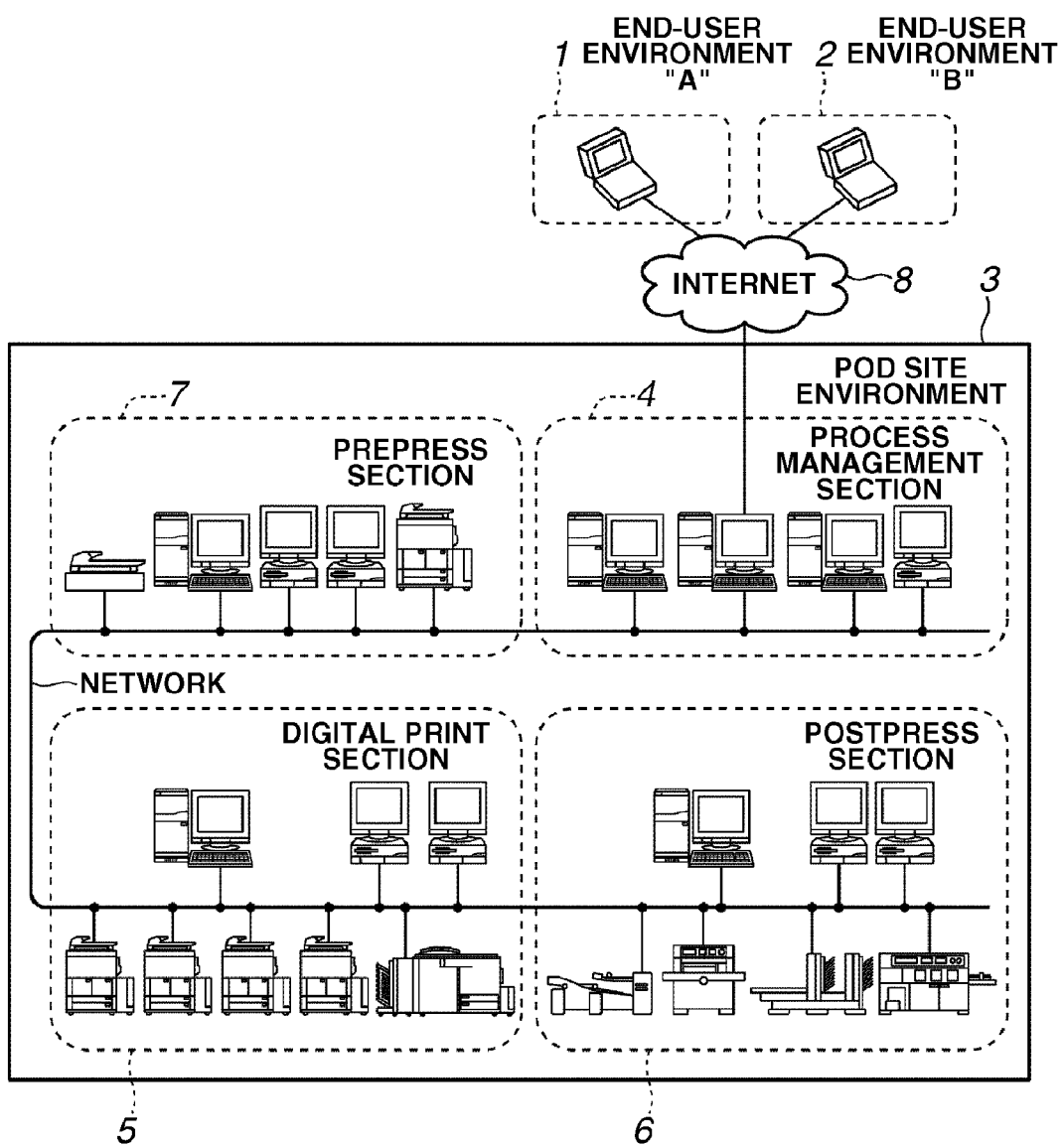
FIG. 1 is a block diagram illustrating an exemplary arrangement of a printing system applicable to a POD system.

The following description of exemplary embodiments is merely illustrative in nature and is in no way intended to limit the invention, its application, or uses.

Processes, techniques, apparatus, and systems as known by one of ordinary skill in the art may not be discussed in detail but are intended to be part of the enabling description where appropriate.

For example, certain circuitry for image processing, data processing, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures.

Various exemplary embodiments will be described in detail below with reference to the drawings.

First Exemplary Embodiment

First, a practical arrangement of the above-described POD system will be described below with reference to FIGS. 1 to 4.

FIG. 1 is a block diagram illustrating an exemplary arrangement of a printing system applicable to the above-described POD system.

As shown in FIG. 1, the printing system includes one or more end-user environments, such as an end-user environment A1, an end-user environment B2, and a POD site environment 3 connected via the Internet 8.

At least one client (orderer) who makes a print order request is present in each of the end-user environment A1 and the end-user environment B2. Each client (orderer), operating the client PC, can request a print job or confirm the status of each job from the end-user environment (i.e., the end-user environment A1 or the end-user environment B2).

The POD site environment 3 usually includes a process management section 4 and a digital print section 5. However, the printing system can further include a postpress section 6 and a prepress section 7 to enhance the function or the ability of a finishing apparatus connected to a digital image forming apparatus such as a digital copying machine or a digital multifunction peripheral.

The process management section 4 can instruct works in respective processes of the digital print section 5, the postpress section 6, and the prepress section 7 in the POD site environment 3. In other words, the process management section 4 can realize integrated management of workflows in the system including computers and various devices. The process management section 4 can receive jobs from individual end-users and store the received jobs. Furthermore, the process management section 4 can assemble two or more individual work processes as a workflow based on the designation of the job requests received from the end-users, and can efficiently schedule the work processes for individual devices or workers.

The prepress section 7 can scan a paper document received from an end-user using a scan device (e.g., scanner/MFP) based on a work instruction of a prepress job received from the process management section 4, and can capture an image of the scanned document as an image file into a prepress server or a client PC. In the description of the present exemplary embodiment, MFP stands for "multifunction peripheral." Furthermore, the prepress section 7 can execute correction of an image, merging of files, insertion/deletion of pages, and various page layout/edit and imposition processing. If necessary, the prepress section 7 can execute proofing for confirming the layout and the tint of a final output product.

The digital print section 5 can copy a paper document received from an end-user by a monochrome MFP or a color MFP, according to a work instruction of a print job received from the process management section 4. Furthermore, the digital print section 5 can cause a print device (e.g., a monochrome MFP or a color MFP) to print a document/image file. The document/image file in the present exemplary embodiment can include a document/image file received from a client PC via a printer driver or a hot folder from an end-user, a scan image file scanned by a scan device, and an edit file.

The postpress section 6 can control post-processing devices (e.g., a paper folding machine, a saddle stitch bookbinding machine, a case binding machine, a paper cutting machine, a mail inserter, and a collator) according to work instructions of a postpress job received from the process management section 4 or the digital print section 5.

The postpress section 6 can execute various finishing processing, including paper folding, saddle stitch bookbinding, case binding, paper cutting, inserting, and collation, applied to recording sheets output from the digital print section 5.

Figure 2:
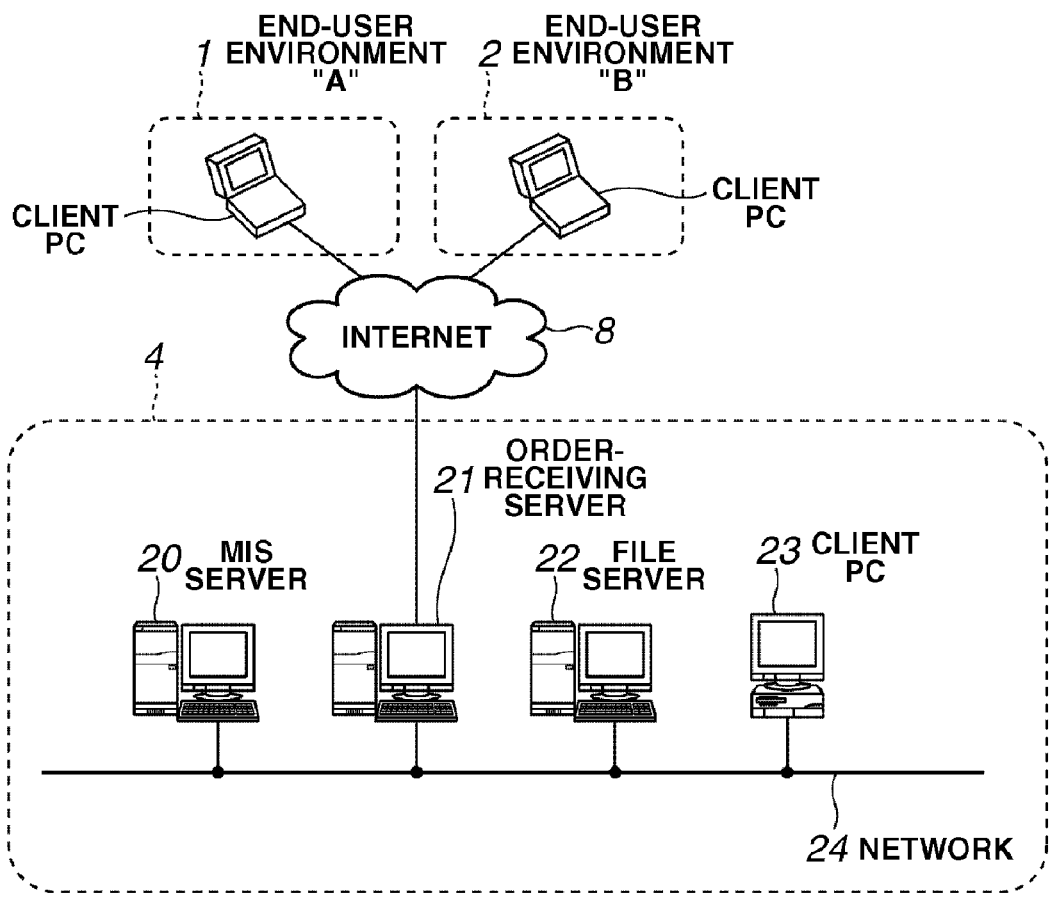
FIG. 2 is a block diagram illustrating a practical arrangement of a process management section in the printing system shown in FIG. 1.

FIG. 2 is a block diagram illustrating a practical arrangement of the process management section 4 in the printing system shown in FIG. 1.

As shown in FIG. 2, the process management section 4 includes a management information system (MIS) server 20, an order-receiving server 21, a file server 22, and a client PC 23, which are connected to a network 24.

The MIS server 20 can manage various workflows, including from reception of an order to delivery of a product, in the system and can manage various administration information and sales information.

The order-receiving server 21 can receive a job (including print request instruction contents and original content data) from an end-user environment via the Internet 8 and can allocate an ID number to each received job to manage the job. Furthermore, the order-receiving server 21 can transmit the ID number and management information to the MIS server 20, and also can transmit image data and other information to succeeding processes according to an instruction from the MIS server 20.

The file server 22 is a document management server that can store each job received from an end-user so as to be used in case of reorder of the same document. In general, the file server 22 can store image data together with setting information used in the previous job.

The client PC (i.e., a host computer) 23 can function as a client of the MIS server 20, the order-receiving server 21, and the file server 22.

The devices 20 to 23 in the process management section 4 can exchange information using a job ticket describing work instructions of a job which can be referred to as job definition format (JDF). The job ticket can be defined as data describing processing required for outputting requested contents when ordered from a device in the system. Using the job ticket, the process management section 4 can transfer a job and issue a control command, to cooperate with the prepress section 7, the digital print section 5, and the postpress section 6 to realize a totally automated workflow.

Figure 3:
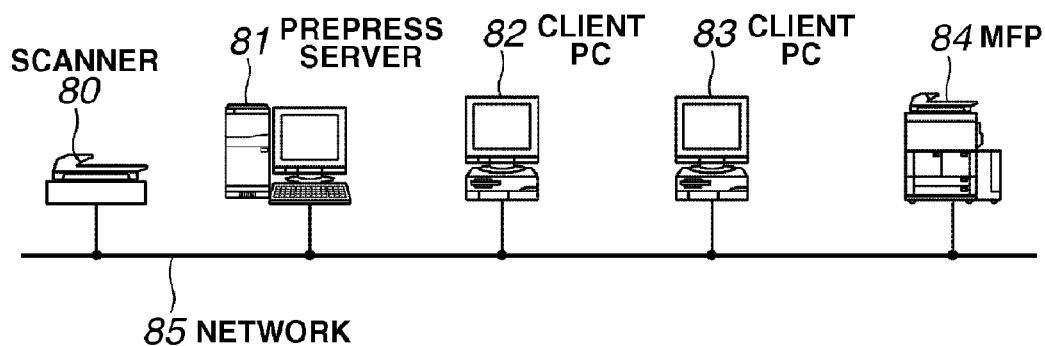
FIG. 3 is a diagram illustrating a practical arrangement of a prepress section in the printing system shown in FIG. 1.

FIG. 3 is a diagram illustrating a practical arrangement of the prepress section 7 in the printing system shown in FIG. 1.

The prepress section 7 shown in FIG. 3 includes a prepress server 81 that can execute various page layout/edit and imposition processing. The prepress server 81 can control a scanner 80 and a scan device of an MFP 84 to capture an image of a paper document received from an end-user as a scan image file, and can execute image correction including correction of obliqueness and removal of black points.

Furthermore, the prepress server 81 can combine plural document/image files received from end-users and plural scan image files scanned by a scan device. Furthermore, the prepress server 81 can execute various page layout/edit and imposition processing including insertion/deletion of pages, addition of page numbers and annotations, insertion of index and cover and interleaf slips, and designation of N-up printing and multi-page printing.

The prepress section 7 can include one prepress server 81 and plural client PCs 82 and 83 as shown in FIG. 3, or can include plural client PCs 82 and 83 only.

The prepress section 7 has the following work processes.

When a copy job is received from an end-user, the scan device (e.g., scanner/MFP) captures an image of a paper document. Then, the prepress server 81 and the client PCs 82 and 83 input a scan image file. When the scan image is inclined, the prepress server 81 and the client PCs 82 and 83 perform processing for correcting the obliqueness of a scan image. Furthermore, when the scan image includes punch holes or spoiled portions, the prepress server 81 and the client PCs 82 and 83 perform processing for removing black points (i.e., images of punch holes and spoiled portion).

Furthermore, when a print job is received from an end-user, the prepress server 81 and the client PCs 82 and 83 input a document/image file received from the end-user. If plural document/image files are received from end-users, or when plural scan image files are obtained by the scan device, the prepress server 81 and the client PCs 82 and 83 can combine these files.

Furthermore, when editing a document/image file or a scan image file is required, the prepress section 7 performs the following work. For example, a worker can operate the prepress server 81 and the client PCs 82 and 83 to insert additional page(s) to or delete page(s) from an edit object file while confirming the layout of plural pages.

Furthermore, the prepress section 7 can execute various page layout/edit and imposition processing. For example, a worker can operate the prepress server 81 and the client PCs 82 and 83 to add page numbers and annotations (e.g., characters and images including watermarks and logos representing confidential information). Furthermore, the prepress server 81 and the client PCs 82 and 83 can execute various page layout/edit and imposition processing including designation of N-up imposition or successive-page printing (printing plural pages on a single printed surface), insertion of index and cover and interleaf slips, and designation of post-processing (e.g., stapling, punching, and Z-shaped folding).

The prepress section 7 can constitute a variable printing system to realize one-to-one marketing (e.g., printing of direct mails or pamphlets dedicated to individual clients). For example, the variable printing system can cooperate with the prepress server 81 and another server, if their databases are available, to perform processing for printing a plurality of sets of the same document while changing the address and print-output data for individual clients.

In the printing industries, before starting plate-making and print processes, a preliminary print (generally referred to as "color comprehensive layout") is often performed for the purpose of presentation to the advertiser. For example, desk top publishing (DTP) using a personal computer to create publication products can be used to perform the color comprehensive layout. Furthermore, a color hard copy outputting a digital color image processed by the color electronic prepress system (CEPS), which is generally used for image correction and composition in the print process, can be used for the color comprehensive layout.

The POD using an MFP or other printer can perform proof output processing, including layout confirmation corresponding to the comprehensive layout, simple tint confirmation, and detailed tint confirmation corresponding to the proof, using the same color MFP or color printer (or using the same monochrome MFP or monochrome printer).

The prepress section 7 can output a proof to an MFP, if necessary, to confirm the layout and tint of a final output product.

As described above, the prepress section 7 includes the prepress server 81, the client PCs 82 and 83, the scanner 80, and the MFP 84, which are connected via the network 85. Respective devices of the prepress section 7 can perform job transfer processing and control command issuing processing via the network 85, to process a job received by the prepress section 7.

Figure 4:
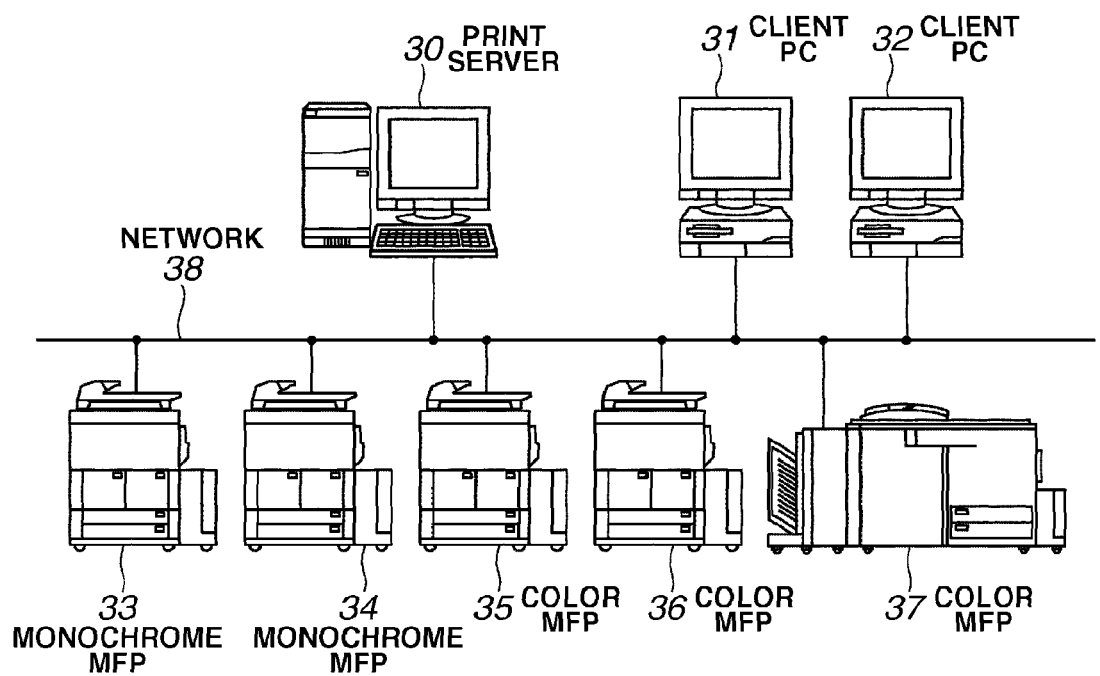
FIG. 4 is a block diagram illustrating a practical arrangement of a digital print section in the printing system shown in FIG. 1.

FIG. 4 is a block diagram illustrating a practical arrangement of the digital print section 5 in the printing system shown in FIG. 1.

As shown in FIG. 4, the digital print section 5 includes a print server 30, two client PCs 31 and 32, three color MFPs 35 to 37, and two monochrome MFPs 33 and 34, which are connected to a network 38.

The print server 30 has two roles. The first role of the print server 30 is transmission and reception of information to and from an external device of the digital print section 5. First, the print server 30 can input image information and setting information of an entered job and can transmit status information to an external device upon finishing the job.

The second role of the print server 30 is management and control of internal devices in the digital print section 5. The print server 30 can manage jobs entered from external devices and jobs generated in the digital print section 5 and can monitor the status of all devices and jobs processed in the digital print section 5. Furthermore, the print server 30 can execute various controls including interruption of job, change of settings, restart of print, as well as copy, transfer, and deletion of job.

The client PCs 31 and 32 can edit application files entered from external devices, instruct a print operation, and input a print ready file. Furthermore, the client PCs 31 and 32 can monitor and control the devices and jobs managed by the print server 30.

The color MFPs 35 to 37 and the monochrome MFPs 33 and 34 are image forming devices having various (e.g., scan, print, and copy) functions. The color MFPs and the monochrome MFPs are different in processing speed and cost, and can be selectively operated for the purpose of use. Furthermore, the color MFP 37 is connected to a finisher apparatus.

Figure 5:
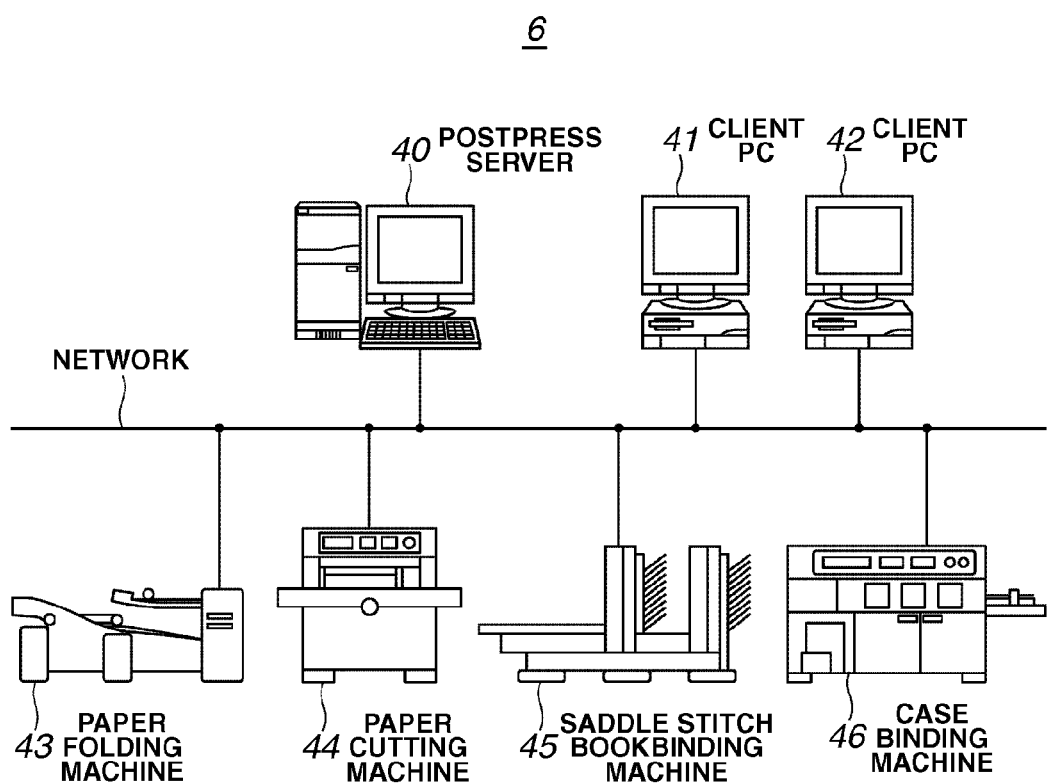
FIG. 5 is a block diagram illustrating a practical arrangement of a postpress section in the printing system shown in FIG. 1.

FIG. 5 is a block diagram illustrating a practical arrangement of the postpress section 6 in the printing system shown in FIG. 1.

As shown in FIG. 5, the postpress section 6 includes a postpress server 40, client PCs 41 and 42, and post-processing devices including a paper folding machine 43, a paper cutting machine 44, a saddle stitch bookbinding machine 45, and a case binding machine 46, which are connected to a network 47.

The postpress server 40 is a computer capable of controlling and managing the post-processing processes. The postpress server 40 can create conditions of the post-processing that can be finished by the postpress section 6 based on a job instruction received by the order-receiving server 21 or a job instruction produced from the MIS server 20, and can instruct post-processing (finishing processing) according to an end-user's request.

In general, the postpress server 40 can use an information exchange unit (e.g., JDF) to communicate with external devices and exchange information with the post-processing devices in the postpress section 6 using internal commands and status.

The post-processing devices can be roughly classified into three categories (i.e., in-line finishers, near-line finishers, and off-line finishers) which are defined in the following manner.

<In-Line Finisher>

The in-line finishers are post-processing devices physically connected to MFPs and can directly receive printed papers produced from the MFPs via paper paths (conveyance paths) Furthermore, the in-line finishers are electrically connected to the MFPs and can receive operational instructions and status confirmation from the MFPs. In the following description, the in-line finishers may be simply referred to as "finisher apparatus."

<Near-Line Finisher>

The near-line finishers are post-processing devices not physically connected to MFPs via paper paths. Thus, workers (operators) of respective near-line finishers are required to manually convey and place (or set) output products. However, the near-line finishers are electrically connected to the MFPs and can transmit and receive information (e.g., operational instructions and status confirmation), via a network or communication medium, to and from the MFPs.

<Off-Line Finisher>

The off-line finishers are post-processing devices not physically connected to MFPs via paper paths and not electrically connected to the MFPs for transmission/reception of operational instructions and status confirmation. Thus, workers of respective off-line finishers are required to manually convey and place (or set) output products, manually input information and data, and confirm the status reported from the devices.

Furthermore, the post-processing devices can execute post-processing processes applied to document sheets printed by MFPs or other image forming devices to finish the document sheets into a bookbinding product requested by each end-user. The post-processing processes applied to the document sheets include a paper cutting process, a saddle stitch bookbinding process, a case binding process, a paper folding process, a punching process, an inserting process, and a collation process.

The postpress server 40 can manage various near-line finishers and, if necessary, can manage off-line finishers. For example, the postpress server 40 can manage a stapler, a punching machine, an mail inserter, and a collator, in addition to the paper folding machine 43, the paper cutting machine 44, the saddle stitch bookbinding machine 45, and the case binding machine 46. The postpress server 40 can monitor the device status and the job status in the near-line finishers by performing successive polling according to a predetermined protocol and can manage the execution status of each job.

In the present exemplary embodiment, the above-described plural post-processing processes can be performed by an integrated system including plural processing devices or can be performed by a single processing apparatus. Furthermore, the system of the present exemplary embodiment can be arranged so as to include some devices in an integrated processing system.

Furthermore, the postpress section 6 may not process all print jobs in the POD system. The color MFP 37 (in the digital print section 5) having a finisher apparatus can execute the post-processing process.

Figure 6:
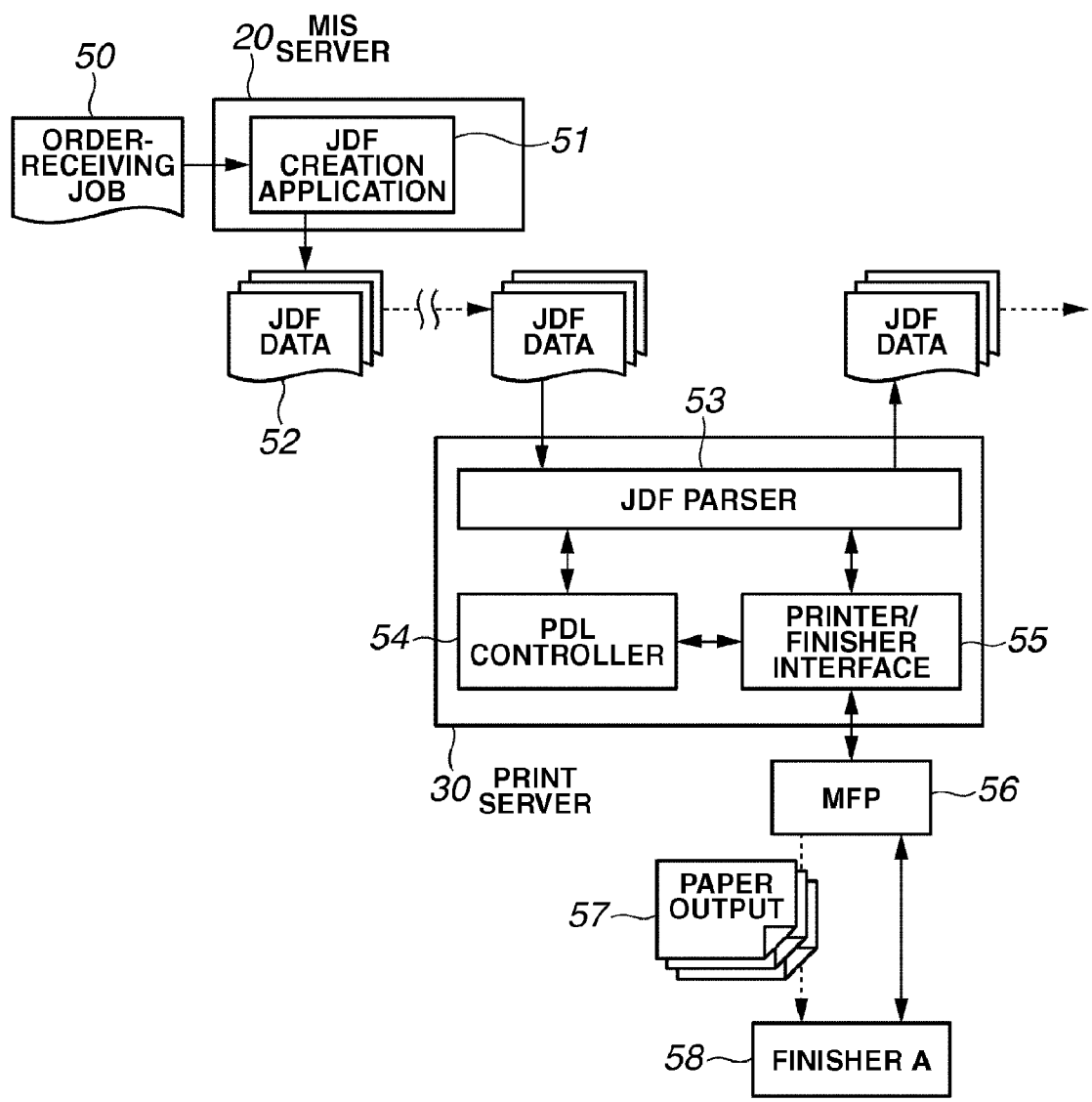
FIG. 6 illustrates an exemplary workflow arrangement realized by a job ticket in the printing system shown in FIG. 1.
Figure 7:
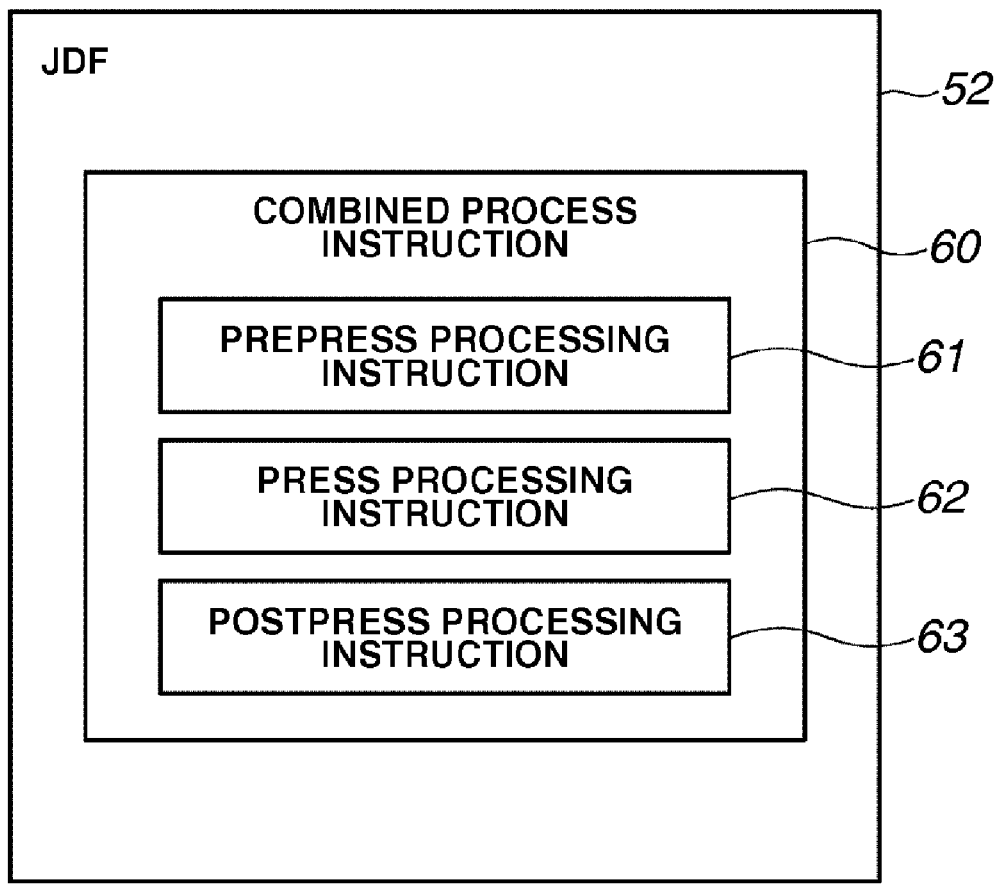
FIG. 7 illustrates an exemplary job ticket structure usable in a POD system according to an embodiment of the present invention.
Figure 8:
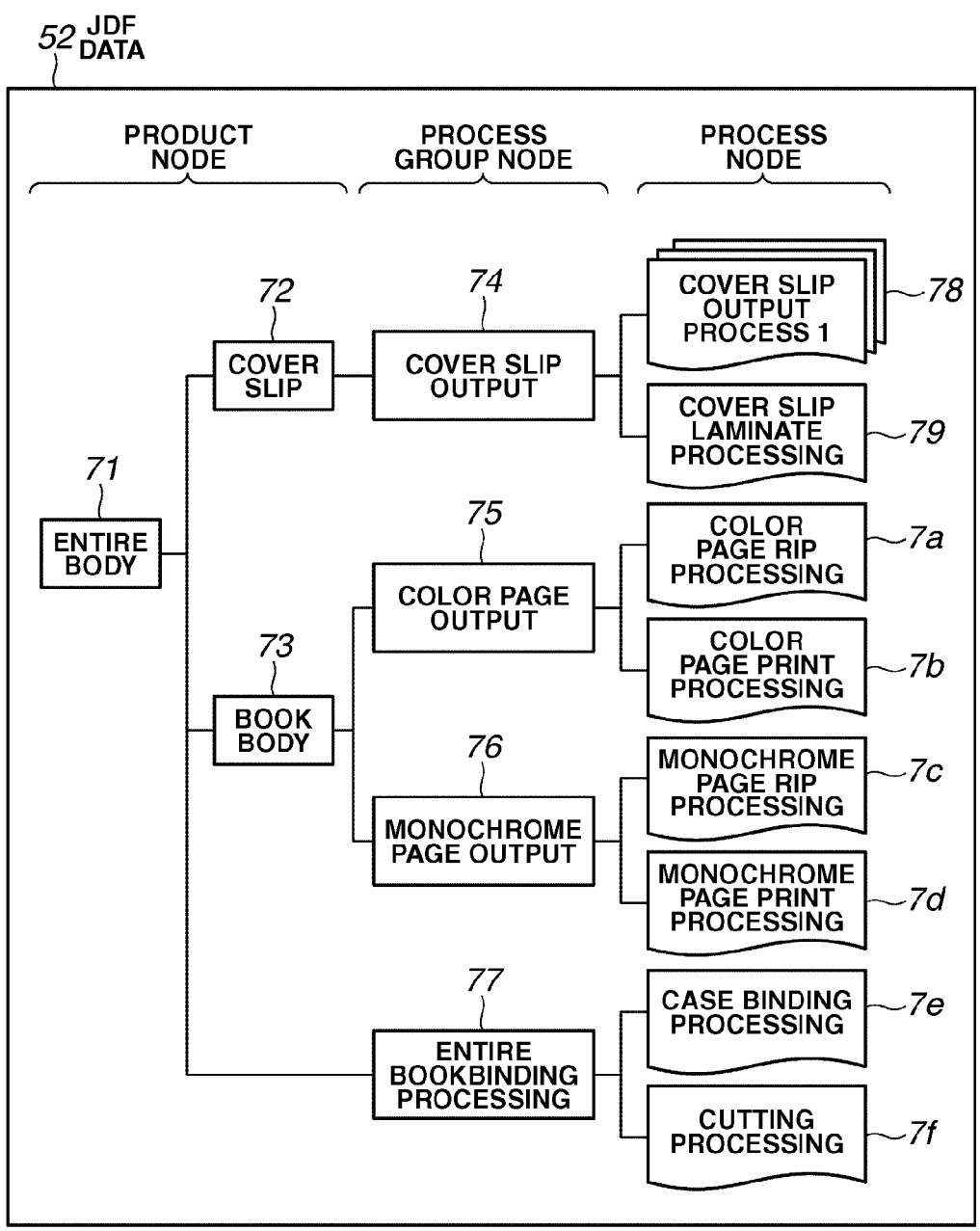
FIG. 8 illustrates another exemplary job ticket structure usable in the POD system according to another embodiment of the present invention.

Furthermore, the print workflow defined by a job ticket can be used in the commercial printing industries. FIGS. 6, 7, and 8 illustrate a practical "workflow defined by a job ticket" and an example of the job ticket usable for the POD system in the commercial printing industries.

FIG. 6 is a diagram illustrating a practical workflow arrangement realized by a job ticket in the printing system shown in FIG. 1. The components identical to those disclosed in FIGS. 1 to 5 are denoted by the same reference numerals.

The MIS server 20 can manage workflows, including from reception of an order to delivery of a product, in the system and can manage various administration information and sales information. The MIS server 20 includes a JDF creation application 51 that can create JDF data 52 (i.e., JDF data for the POD site environment 3) based on an order-receiving job 50. The JDF data 52 corresponds to a job ticket that describes work instructions in a workflow.

The order-receiving job 50 can be input from the end-user environments 1 and 2 into the MIS server 20 via the order-receiving server 21. The order-receiving job 50 can include PDF data and work instruction data. Furthermore, the work instruction data can be JDF data or any other data. The MIS server 20 can create JDF data 52 for the POD site environment 3 based on the JDF data.

The print server 30 can receive a job entered from the digital print section 5 and can manage and control the digital print section. The print server 30 includes a JDF parser 53, a PDL controller 54, and a printer/finisher interface 55. The JDF parser 53 can interpret the JDF data 52. Furthermore, the PDL controller 54 can process various PDL data including PDF/PS. The printer/finisher interface 55 is connected via an MFP 56 to a finisher apparatus (finisher A) 58.

The workflow using a job ticket can be realized in the following manner.

When the order-receiving job 50 is entered into the MIS server 20, the JDF creation application 51 installed in the MIS server 20 enables a worker to create the JDF data 52 corresponding to a job ticket that describes work instructions in a workflow.

When the JDF data 52 is transmitted to the print server 30, the JDF parser 53 of the print server 30 interprets the JDF data 52 and executes a job designating the digital print section 5. For example, the JDF data 52 can include attribute information (e.g., output paper size, two-sided or one-sided printing, and N-up imposition). The PDL controller 54 processes the PDF/PS and other PDL data with reference to the contents of the JDF data 52 and controls, via the printer/finisher interface 55, the MFP 56 to execute a printing operation.

The document (paper sheet) 57 output from the MFP 56 is conveyed to the finisher A 58. If the JDF data 52 include attribute (e.g., case binding, saddle stitch bookbinding, and paper cutting) information, the finisher A 58 executes post-processing according to the contents of the JDF data 52 received via the printer/finisher interface 55.

FIGS. 7 and 8 illustrate exemplary job ticket structures usable in the POD system.

FIG. 7 illustrates an exemplary job ticket structure usable in the POD system according to an embodiment of the present invention.

FIG. 7 shows an entire structure of the JDF data 52. A prepress processing instruction 61 describes an instruction group relating to prepress processes (e.g., image processing applied to PDF and other content data, and processing for disposing the data).

A press processing instruction 62 describes an instruction group relating to press processes (e.g., processing for outputting a document including the image data created according to the prepress processing instruction 61). A postpress processing instruction 63 describes an instruction group including postpress processes (e.g., case binding processing applied to the document output according to the press processing instruction 62).

A combined process instruction 60 includes the prepress processing instruction 61, the press processing instruction 62, and the postpress processing instruction 63, which are combined as single processing.

In general, a color MFP (refer to the MFP 37) performing a digital printing operation can produce a single output product resulting from sequential operations (including from the prepress processing to the postpress processing) in response to entry of one print job.

The combined process instruction 60 is useful when the prepress processing (pre-print processing), the press processing (print processing), and the postpress processing (post-print processing) are successively performed for the input data. The combined process instruction 60 can be used for an MFP or other digital image forming apparatus that has at least two of prepress processing, press processing, and postpress processing functions.

FIG. 8 illustrates an exemplary job ticket structure usable in the POD system according to another embodiment of the present invention.

The JDF, expressing a job ticket, can be described according to extended markup language (XML) format and can be expressed as a hierarchical structure of nodes. FIG. 8 shows a hierarchical structure including detailed bookbinding processes designated by JDF, while FIG. 7 shows a JDF structure classified according to the type of execution process.

As shown in FIG. 8, an "entire body" 71 can be fabricated by binding a "cover slip" 72 and a "book body" 73 together into a book. Through these processes, the "entire body 71" can be accomplished and delivered to each end-user.

In the JDF, each process for fabricating a physical output product can be referred to as a product node and each process for fabricating product nodes can be referred to as a process node. Furthermore, an assembly including plural process nodes (i.e., intermediate elements fabricating the product nodes) can be referred to as a process group node. The process group node includes a cover slip output 74, a color page output 75, a monochrome page output 76, and entire bookbinding processing 77. In this manner, the JDF includes discriminable processes.

The prepress processing instruction 61 shown in FIG. 7 corresponds to color page RIP processing 7a and monochrome page RIP processing 7c shown in FIG. 8.

Furthermore, the press processing instruction 62 shown in FIG. 7 corresponds to cover slip output process 78, cover slip laminate processing 79, color page print processing 7b, and monochrome page print processing 7d shown in FIG. 8.

Furthermore, the postpress processing instruction 63 shown in FIG. 7 corresponds to case binding processing 7e and paper cutting processing 7f.

Figure 9:
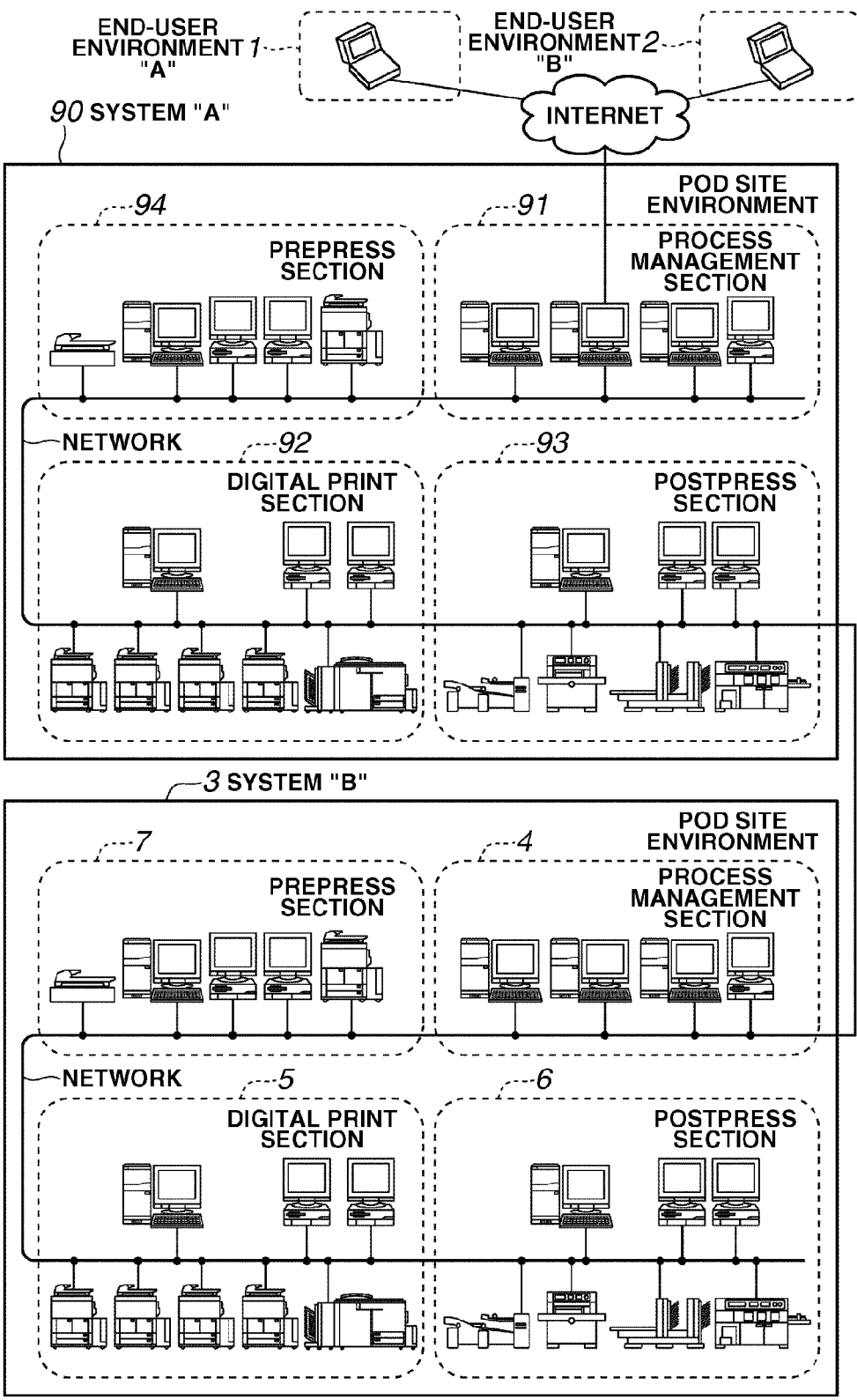
FIG. 9 is a block diagram illustrating a practical arrangement of a conventional integrated printing system.

FIG. 9 is a block diagram illustrating a practical arrangement of a conventional integrated printing system, in which plural POD systems having different functions are connected. In FIG. 9, a system B is a POD system similar to the printing system shown in FIG. 1 and a system A is a POD system having different functions (devices) compared to the devices of the system B. The end-user environments 1 and 2 are connected to the system A. The components similar to those illustrated in FIG. 1 are denoted by the same reference numerals.

FIG. 9 shows a POD site environment 90 of the system A, which includes a process management section 91, a digital print section 92, a postpress section 93, and a prepress section 94 of the system A. The system A (POD site environment 90) and the system B (POD site environment 3) are connected with each other via a network.

If the digital print section 92 of the system A cannot be used temporarily (for example, due to malfunction or trouble, lack of print documents, or processing delay caused due to multiple print job requests), a print job can be transferred from the system A to the system B. In this case, the digital print section 5 in the system B can perform continued processing according to the JDF contents included in the print job.

The finishers can perform bookbinding (e.g., stapling, punching, saddle stitch bookbinding, and case binding) processing for document sheets output from the image forming processing apparatus.

An exemplary embodiment of the present invention will be described in detail below with reference to the drawings.

First, in addition to the above-described problems, various problems occur if requested print data is transferred to a different system.

It is now assumed that the resolution of original content entered into the system A is 1200 dpi, the device resolution of the prepress section 94 in the system A is 300 dpi, and the device resolution of the system B is 600 dpi.

In this case, to reduce the file size, the prepress section 94 of the system A creates PDF suitable for its device resolution (300 dpi) by down-sampling the original content (1200 dpi). If the PDF equal to 300 dpi is transferred and printed in the system B having the device resolution equal to 600 dpi, the print quality will be deteriorated compared to the original content (1200 dpi).

Furthermore, the digital print section 92 of the system A may be different from the digital print section 5 of the system B not only in the device resolution but also in the drawing logic when the line width is less than 1 dot.

In such a case, a hairline correction suitable for the device in the system A may be applied to the PDF. However, the hairline correction if applied to the device in the system B may erase or undesirably thicken the lines.

It is now assumed that the system A has device resolution equal to 300 dpi and a hairline processing logic that cuts off fractions less than 1 dot and the system B has device resolution equal to 600 dpi and a hairline processing logic that counts fractions over ½ as one and disregards the rest.

In the above-described conditions, if a line equal to "0.1" point width is drawn, the system A and the system B determine the dot width in the following manner.

System A: 0.1 point=0.1×300/72=0.41 dot (0.41666 - - - )= 0 dot

System B: 0.1 point=0.1×600/72=0.83 dot (0.83333 - - - )= 1 dot

In this manner, the line width determined by the system A is "0 dot" and the device of the system A requires hairline processing for the above-described line. On the other hand, the line width determined by the system B is "1 dot" and accordingly no hairline processing is required.

In such a case, the lines in the PDF for the system A that has been subjected to the hairline processing may become bold when printed in the system B.

Furthermore, the JDF transmitted from the system A may include an image processing instruction that the system B cannot execute. In such a case, the system B disregards the print job and stops the processing.

For example, the system B may not support screening function parameters described in JDF transmitted from the system A. In this case, the system B cannot execute the image processing according to an end-user's request. The processing in the system B may be stopped, or the parameters may be rounded to default parameters of the system A and, accordingly, a different print result will be obtained.

Furthermore, JDF transmitted from the system A may describe processing instructions in a designated order that the system B cannot execute. The system B will disregard the job and stop the processing.

For example, when the saddle stitch processing is applied to obtain a book composed of A4-size pages, the system A can perform multi-page printing for obtaining an A2-size document including printed data separated in two regions, can apply stitch processing to two regions, can cut the sheet along the center line, and can create a final output product (i.e., a book), as described in detail below with reference to FIG. 10.

Figure 10:
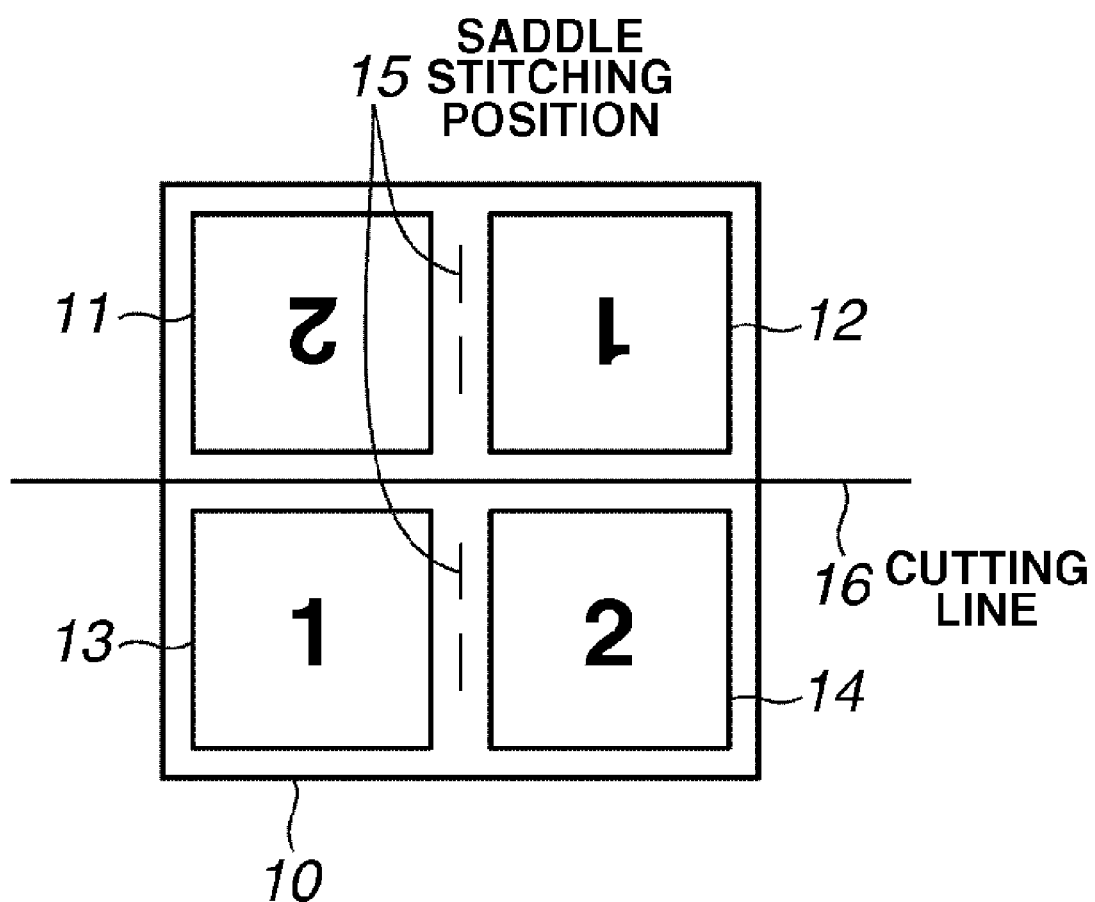
FIG. 10 illustrates an example of a document that cannot be processed by the conventional integrated printing system shown in FIG. 9.

FIG. 10 illustrates an example of a document that the conventional integrated printing system shown in FIG. 9 cannot process.

In FIG. 10, an A2-size document 10 includes A4-size pages 11, 12, 13, and 14, in which two pages 12 and 13 are identical to each other and other two pages 11 and 14 are identical to each other. FIG. 10 shows four stitching positions 15 and one cutting line 16.

To execute the saddle stitch processing shown in FIG. 10, the JDF can describe sequential processing, i.e., pre-print processing →print processing →two-region stitch processing (stitch processing at four positions) →cutting processing.

When the JDF including the above-described sequential processing instructions is transmitted to the system B, the system B cannot execute these instructions as described in the JDF if the system B does not have the A2-size print function or the four-position stitching function.

To solve this problem, the conventional printing system requires a worker to confirm the contents of PDF and JDF and manually change the settings. Thus, complicated and time consuming manual operations are required. As a result, the work cost increases.

Figure 11:
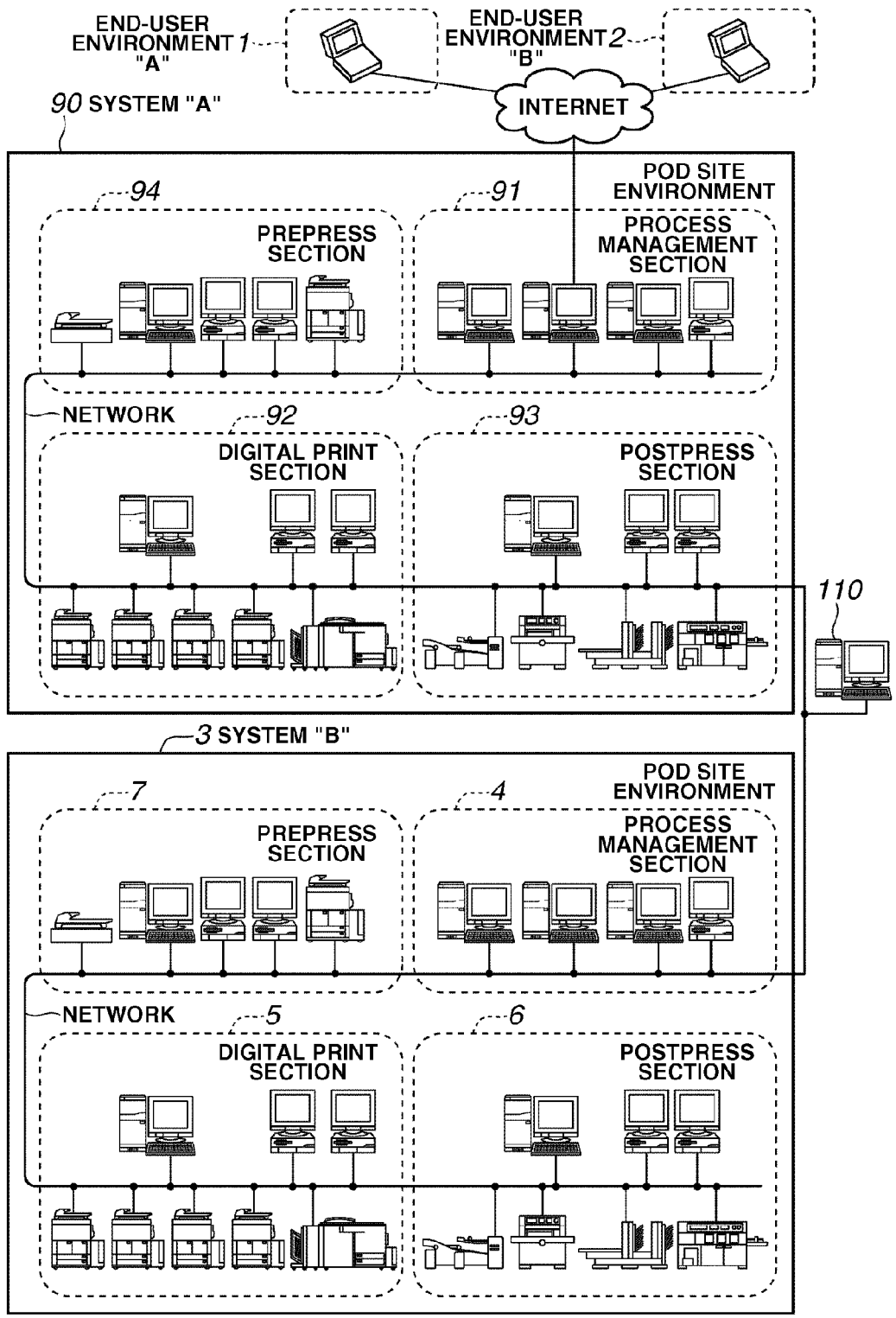
FIG. 11 is a block diagram illustrating an exemplary arrangement of an integrated printing system in accordance with an embodiment.

FIG. 11 is a block diagram illustrating an exemplary arrangement of an integrated printing system in accordance with the first exemplary embodiment. In FIG. 11, components similar to those illustrated in FIGS. 2-5 and 9 are denoted by the same reference numerals.

In FIG. 11, a job portal processing section 110 of the system B can be a personal computer.

A print job, if transmitted from the system A (i.e., POD site environment 90) to the system B (i.e., POD site environment 3), is received by the job portal processing section 110. The job portal processing section 110 can convert the print job transmitted from the system A into a print job suitable for the system B, and can transmit the converted print job to the process management section 4 of the system B.

Then, the process management section 4 of the system B can transfer the received print job to the digital print section 5 or to another processing section according to JDF instructions involved in the print job. The print job changing method will be described later in more detail. The printing system shown in FIG. 11 has the arrangement similar to those shown in FIGS. 2-5 and 9.

The arrangement shown in FIGS. 2-5 and 9 represents a general POD system. In the present invention, the devices of the printing system can be used for various purposes not related to the present exemplary embodiment.

Figure 12:
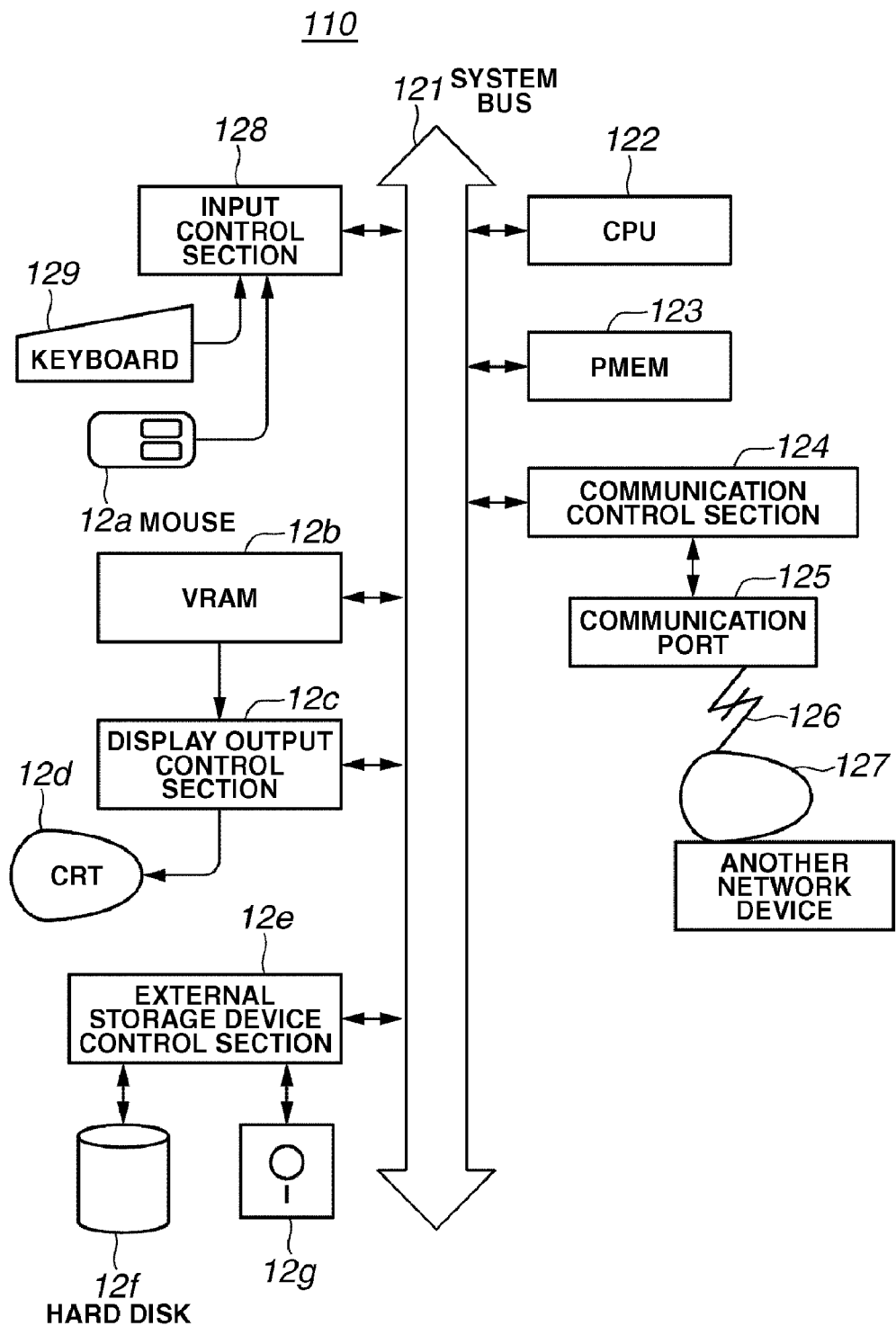
FIG. 12 is a block diagram illustrating a practical arrangement of a job portal processing section shown in FIG. 11.

FIG. 12 is a block diagram illustrating a practical arrangement of the job portal processing section 110 shown in FIG. 11.

As shown in FIG. 12, various components are connected via a system bus 121 in the job portal processing section 110.

A central processing unit (CPU) 122 can select and load a program from a hard disk 12f into a program memory (hereinafter, referred to as "PMEM") 123 and can execute the readout program to realize various operations (e.g., transmission/reception of print job data, and analysis of JDF data) according to the present exemplary embodiment. Furthermore, the CPU 122 can store created data and print processing data in the PMEM 123 that can function as a data storage memory. The PMEM 123 can also function as a temporary memory capable of storing various instructions for the CPU 122.

A communication control section 124 can control the input/output of data via a communication port 125. A signal output from the communication port 125 can be transmitted, via a network 126, to a communication port of another apparatus 127 connected to the network.

The other apparatus 127 may be the MIS server of the process management section 91 in the system A or the MIS server 20 of the process management section 4 in the system B.

The present exemplary embodiment can use any network arrangement other than LAN. For example, the communication port connected to the communication control section and the communication line can be a general public circuit or other communication media.

An input control section 128 is connected to a keyboard 129 and a pointing device (hereinafter, referred to as "PD"). The PD used in the present exemplary embodiment is a mouse 12a. An operator can operate the keyboard 129 and the mouse 12a to input instructions to the job portal system.

Furthermore, the job portal processing section 110 includes a video image memory (hereinafter, referred to as "VRAM") 12b, a display output control section 12c, and a CRT 12d. The image data to be displayed on the CRT 12d can be expanded into bit map data in the VRAM 12b. The display output control section 12c can control the bit map data rasterized in the VRAM 12b so as to be displayed on the CRT 12d.

An external storage device control section 12e is connected to a hard disk (hereinafter, referred to as "HD") 12f and a flexible disk (hereinafter, referred to as "FD") 12g, which are data file media capable of storing print job data received from the system A and content data downloaded from the file server of the system A. The external storage device control section 12e can control writing and reading of data into and from the HD 12f and the FD 12g.

In the present exemplary embodiment, the HD 12f can store various programs. However, the present exemplary embodiment can use any other recording medium capable of storing the programs, such as a ROM, a flexible disk 12g, a CD-ROM, a memory card, or a magneto-optical disk.

Figure 13:
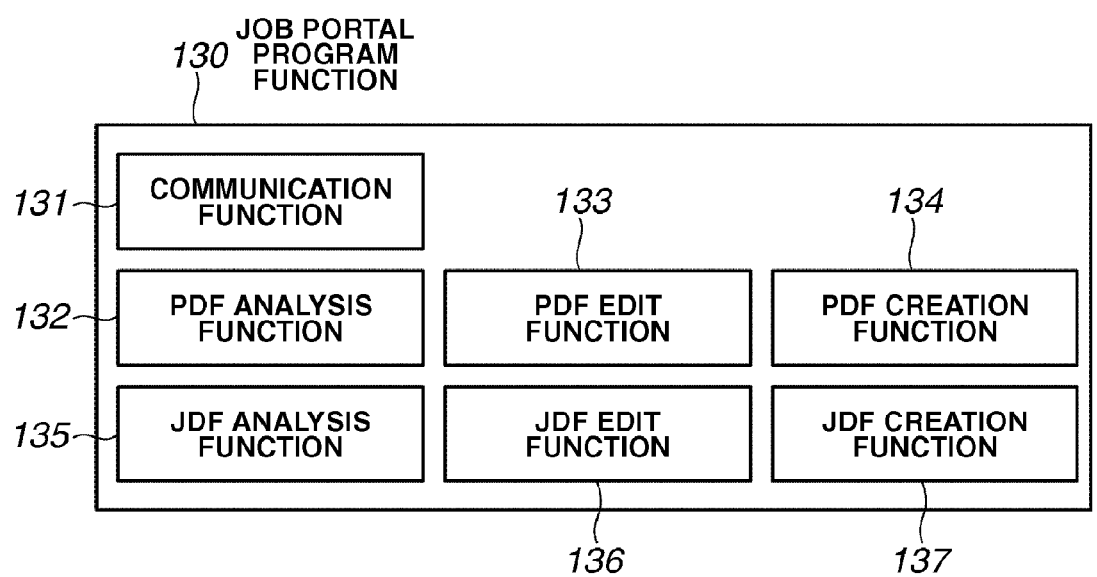
FIG. 13 illustrates an exemplary arrangement of the job portal processing section shown in FIG. 11.

FIG. 13 is a diagram illustrating an exemplary functional arrangement of the job portal processing section 110 shown in FIG. 11.

In FIG. 13, a job portal program function 130 includes a communication function 131, a PDF analysis function 132, a PDF edit function 133, a PDF creation function 134, a JDF analysis function 135, a JDF edit function 136, and a JDF creation function 137. The communication function 131 can support various communication protocols, such as http, https, and SNMP, to receive a print job from the system A and transmit the print job to the system B. The PDF analysis function 132 enables the job portal processing section 110 to analyze various setting information of the PDF and the contents of an object.

The PDF edit function 133 enables the job portal processing section 110 to apply imposition processing to the PDF arranged by 1up (representing a logical page number "1" for the imposition of a piece of media) and create PDF being set to N-up (representing a logical page number "N" for the imposition of a piece of media). The PDF creation function 134 enables the job portal processing section 110 to create a PDF file from the PDF data created by the PDF edit function 133.

The JDF analysis function 135 enables the job portal processing section 110 to analysis the contents of JDF received from one system (e.g., system A). The JDF edit function 136 enables the job portal processing section 110 to edit the JDF data analyzed by the JDF analysis function 135 (e.g., addition, deletion, and change of element attribute). The JDF creation function 137 enables the job portal processing section 110 to create JDF data dedicated to the system B from the data created by the JDF edit function 136.

In the present exemplary embodiment, the job portal processing section 110 can realize the functions 131 through 137 by executing software programs. In the job portal processing section 110, the programs are loaded from the HD 12f into the PMEM 123 and the CPU 122 can execute the readout programs.

Figure 14:
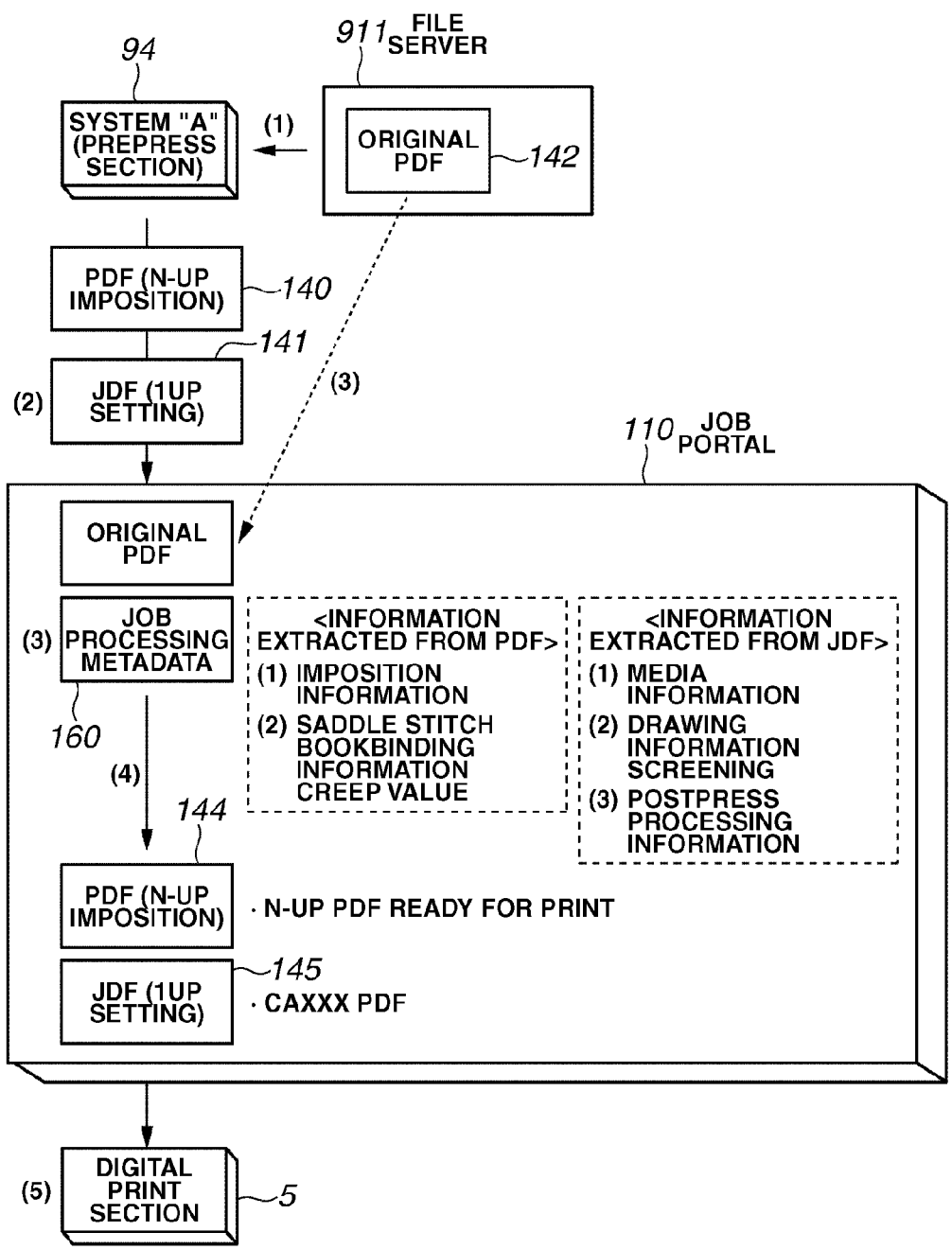
FIG. 14 is a flow diagram schematically illustrating a flow of data and processing contents in the integrated printing system shown in FIG. 11.

FIG. 14 is a flow diagram schematically illustrating the flow of data and processing contents in the integrated printing system shown in FIG. 11, wherein components similar to those illustrated in FIGS. 11 and 2-5 are denoted by the same reference numerals.

As shown in FIG. 14, a file server 911 of the process management section 91 in the system A can store original PDF 142 entered from a client. The original PDF 142 is PDF entered by an end-user and not yet edited.

First, the MIS of the process management section 91 in the system A starts print job processing and transmits JDF to the prepress section 94 of the system A. The file server 911 transmits the PDF 142 to the prepress section 94 of the system A (refer to number (1)).

Then, the prepress section 94 performs processing for creating PDF 140 (including content corresponding to the system A) so that the digital print section 92 of the system A can perform appropriate print processing. In other words, the prepress section 94 reduces (contracts) the original PDF 142 into the PDF 140 so as to fit to the imposition processing, hairline processing, and the printing margin of device.

Furthermore, the prepress section 94 creates image edit instructions processible in the digital print section 92 of the system A and creates processing instruction items and a processing order suitable for a combination of the digital print section 92 and the postpress section 93. Then, the prepress section 94 creates JDF 141 (a work instruction F corresponding to the system A) describing created results.

Then, the print job arranged by the PDF 140 and JDF 141, subjected to the processing in the prepress section 94, is transmitted to the job portal processing section 110 (refer to number (2)). In this case, the above-described processing delay and errors are conditions for transmitting the print job created for the system A to the job portal processing section 110.

The job portal processing section 110, when received the print job (PDF 140, JDF 141) from the system A, downloads the original PDF 142 corresponding to the print job from the file server 911. As the received JDF 141 describes a storage place of the original PDF 142, the job portal processing section 110 can download the original PDF 142 by interpreting the JDF 141. Furthermore, the job portal processing section 110 creates job processing metadata 160 with reference to, or analyzing, the differences of three files (i.e., PDF 140, JDF 141, and PDF 142) (refer to number (3)).

Then, the job portal processing section 110 creates JDF 145 dedicated to the system B based on device function information (i.e., information relating to device functions of the system B, which can be also referred to as "capability information") and the job processing metadata 160. The job portal processing section 110 can communicate with the system B to obtain the device function information. An administrator can input the device function information. The HD 12*f* can store the device function information. Furthermore, the job portal processing section 110 creates PDF 144 dedicated to the system B based on the original PDF 142, the job processing metadata 160, and the device function information (refer to number (4)).

Then, the job portal processing section 110 transmits the PDF 144 and JDF 145 (as a print job for the system B) to the digital print section 5 (refer to number (5)). As a result, the digital print section 5 in the system B can perform continued processing according to the print job formerly designating the processing in the system A.

The method for creating the job processing metadata 160, the JDF 145 dedicated to the system B, and the PDF 144 dedicated to the system B will be described with reference to the drawings.

Furthermore, according to an example shown in FIG. 14, the job portal processing section 110 determines the digital print section 5 as a processing section required for performing the continued processing and transmits the print job to the digital print section 5. However, the MIS server 20 in the system B can perform the above-described determination. More specifically, the job portal processing section 110 can always transmit a print job created for the system B to the MIS server 20 of the system B. Then, the MIS server 20 can distribute the print job to the prepress section 7, the digital print section 5, or the postpress section 6 in the system B according to the contents of the JDF.

Furthermore, according to the example shown in FIG. 14, the PDF 144 dedicated for the system B is created by the job portal processing section 110. However, the job portal processing section 110 can create JDF dedicated to the system B so as to instruct "creation of PDF in the prepress section 7 of the system B" and can transmit the print job to the MIS server 20 in the system B.

Figure 15:
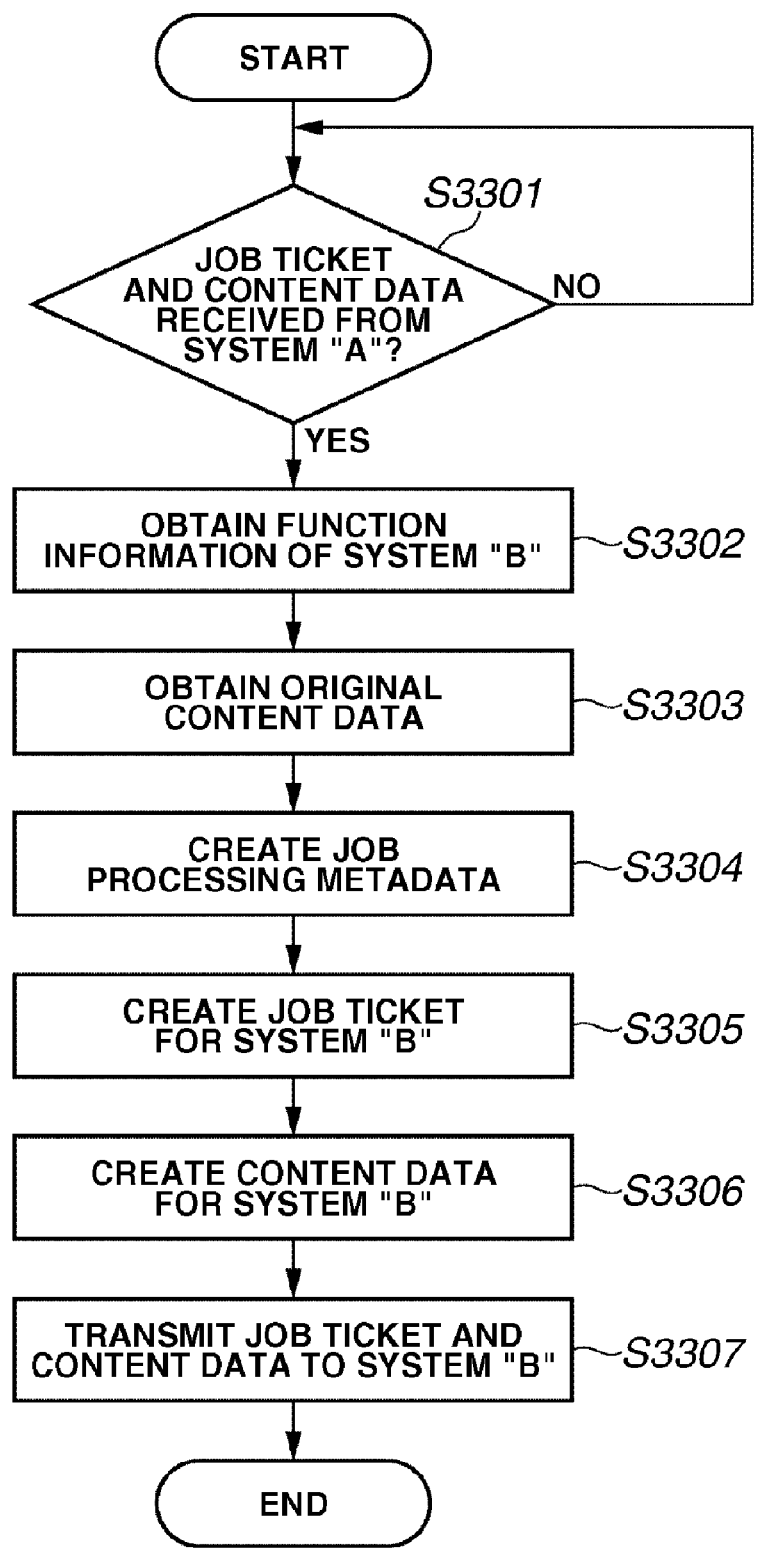
FIG. 15 is a flowchart showing a first control processing procedure in the integrated print processing section in accordance with an exemplary embodiment.
Figure 16:
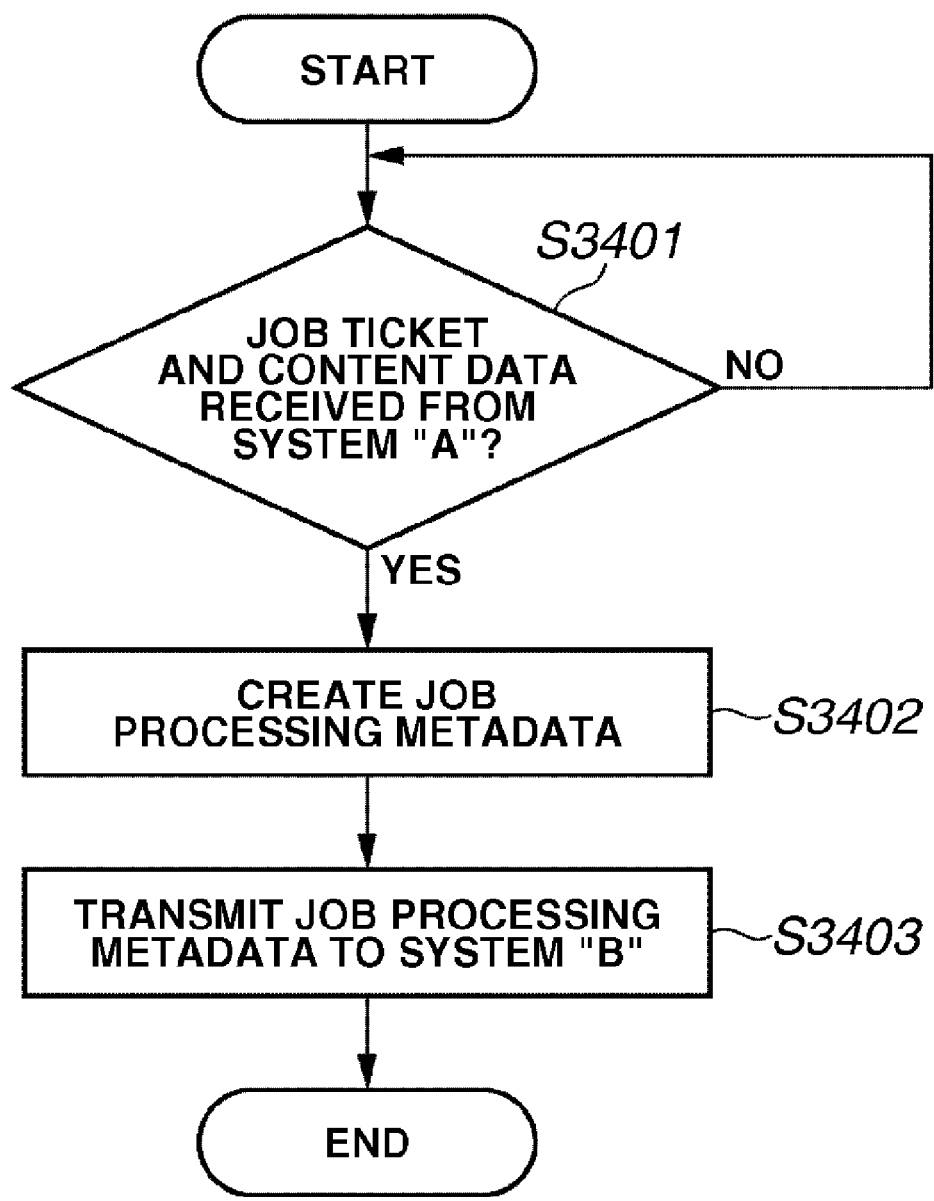
FIG. 16 is a flowchart showing a second control processing procedure in the integrated print processing section in accordance with an exemplary embodiment.

FIGS. 15 and 16 show an entire processing flow of the job portal processing section 110.

FIG. 15 is a flowchart showing a first control processing procedure in the integrated print processing section in accordance with an exemplary embodiment.

FIG. 16 is a flowchart showing a second control processing procedure in the integrated print processing section in accordance with an exemplary embodiment.

To realize the processing of the flowcharts of FIGS. 15 and 16, the CPU 122 shown in FIG. 12 can load programs corresponding to steps S3301 to S3307 of FIG. 15 and steps S3401 to S3403 of FIG. 16 from the PMEM 123 into the HD 12*f* and can execute the readout program.

The job portal processing section 110 can create JDF for the system B according to the flowchart of FIG. 15. The job portal processing section 110 can create job processing metadata for the system B according to the flowchart of FIG. 16. For example, the job portal processing section 110 performs the processing of FIG. 16 when no processing is required for RIP information and imposition information.

First, the flowchart of FIG. 15 will be described.

The CPU 122 determines whether a job ticket for the system A and content data are received from the system A (refer to step S3301). As illustrated in FIG. 14, the system A creates a job ticket for the system A (i.e., JDF 141 shown in FIG. 14 which can be referred to as work instruction data) and content data for the system A (i.e., PDF 140 shown in FIG. 14) based on print request instruction contents and original content data. The processing in step S3301 is for confirming reception of the job ticket created by the system A and the content data for the system A.

When the job ticket for the system A and the content data are received from the system A (i.e., YES in S3301), the CPU 122 obtains device function information of the system B (refer to step S3302).

Then, the CPU 122 obtains original content data (refer to step S3303). The CPU 122 can execute the processing of step S3303 based on the job ticket received in step S3301 that describes a storage place of the original content data. Namely, the processing of step S3303 is for obtaining original content data used by the system A to create the content data for the system A.

Then, the CPU 122 creates job processing metadata (intermediate work instruction data) based on the job ticket for the system A, the content data for the system A, function information of an image forming apparatus in the system B, and the original data (refer to step S3304). Details of step S3304 will be described with reference to FIGS. 18 to 25.

Then, the CPU 122 creates a job ticket for the system B based on the job ticket for the system A, the content data for the system A, the device function information in the system B, and the original data (refer to step S3305). In this case, the CPU 122 can convert created job processing metadata into work instruction data for the system B with reference to the device function information in the system B. Details of step S3305 will be described with reference to FIGS. 26 to 30.

Then, the CPU 122 creates content data for the system B based on the original content data obtained in step S3303 and the intermediate work instruction data created in step S3304 (refer to step S3306). Details of step S3306 will be described with reference to FIG. 31.

Then, the CPU 122 transmits the job ticket and the content data created in steps S3305 and S3306 to the system B (refer to step S3307).

According to the flowchart shown in FIG. 15, the CPU 122 creates the job ticket for the system B based on the job ticket for the system A, the content data for the system A, the device function information in the system B, and the original data. However, the CPU 122 can create a job ticket or job processing metadata without using the original data.

Figure 20:
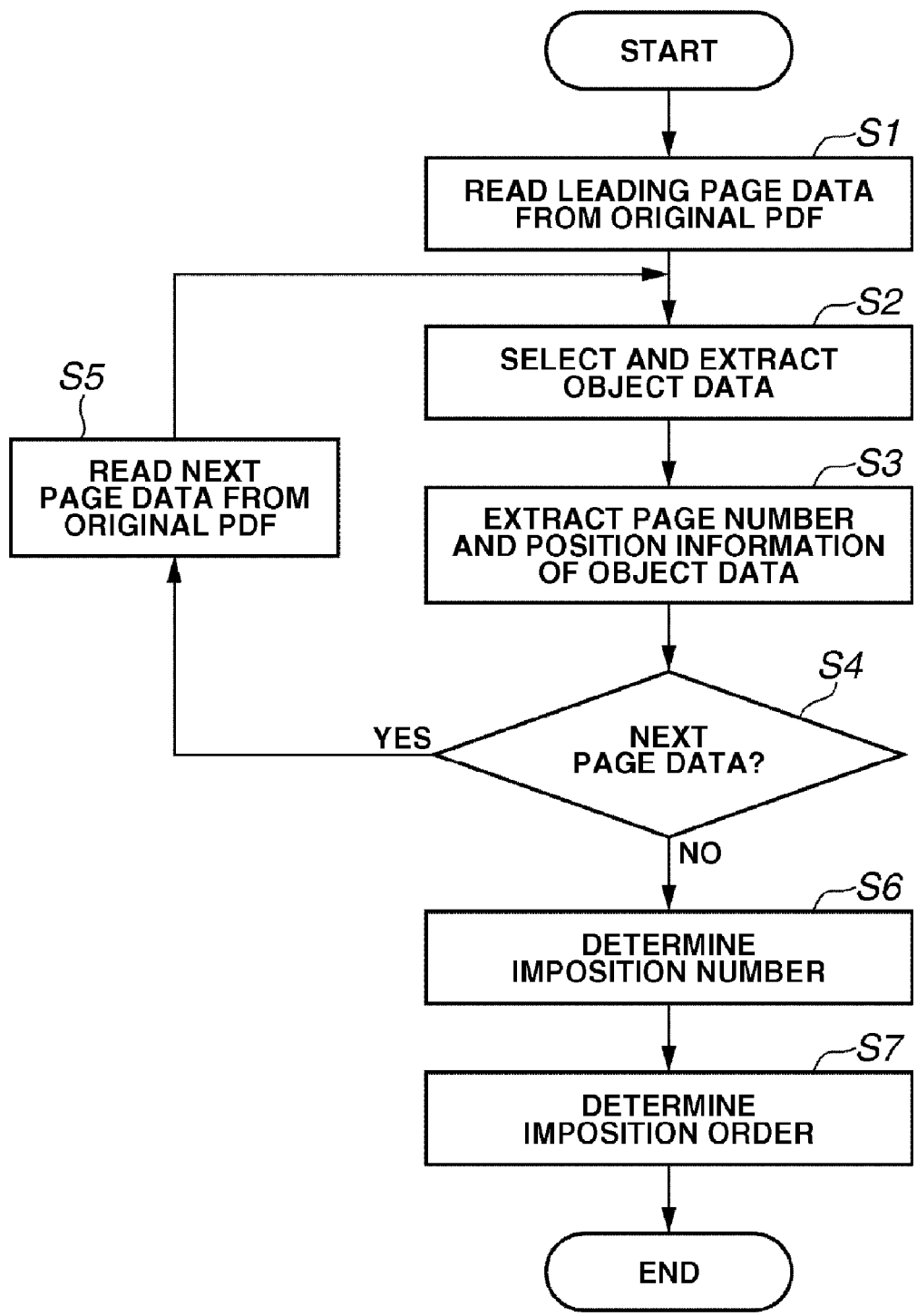
FIG. 20 is a flowchart showing a third control processing procedure in the integrated printing system in accordance with an exemplary embodiment.

For example, although the imposition processing described in FIG. 20 uses the original data, the imposition processing can be executed without using the original data if the job requires no imposition processing. Accordingly, the CPU 122 can create a job ticket for the system B and job processing metadata, at least, based on the job ticket for the system A, the content data for the system A, and the device function information in the system B. However, a reprinting operation requiring imposition processing will be unfeasible if the creation processing is performed based on only the above-described three types of information. It is, therefore, preferable to use the above-described four types of information in step S3305.

As a result of the processing shown in FIG. 15, the system B can receive the work instruction data for the system B transferred from the job portal processing section 110. Then, according to processing contents described in the received job ticket for the system B, the system B can execute the processing to be executed in the system B.

Next, the processing of the flowchart shown in FIG. 16 will be described.

First, the CPU 122 determines whether the job ticket for the system A and the content data are received from the system A (refer to step S3401).

When the job ticket for the system A and the content data are received (i.e., YES in step S3401), the CPU 122 creates job processing metadata interpretable by the system B based on the job ticket for the system A received from the system A and the content data for the system A (refer to step S3402). For example, the CPU 122 can create job processing metadata without using the original content data when no processing is required for RIP information and imposition information. In short, the CPU 122 can create job processing metadata for the system B based on the job ticket for the system A and the content data for the system A.

Then, the CPU 122 transfers the created job processing metadata to the system B (refer to step S3403). The job processing metadata created in FIG. 16, when transmitted to the system B, can be converted into a job ticket for the system B. More specifically, as a result of the processing shown in FIG. 16, the CPU 122 can create data usable for determining whether the processing involved in the job processing metadata is executable in the system B based on the comparison of device function information.

Furthermore, step S3402 of FIG. 16 is not limited to the processing for creating the job processing metadata interpretable in the system B based on the job ticket for the system A received from the system A and the content data for the system A. For example, the CPU 122 can obtain the original content data used when the content data for the system A is created. Then, the CPU 122 can create job processing metadata based on the job ticket for the system A, the content data for the system A, and the original content data.

As a result of the processing shown in FIG. 16, the system B can receive the job ticket for the system B transferred from the job portal processing section 110. Then, the system B can create a job ticket for the system B based on the function information in the system B and the job processing metadata for the system B.

Figure 17:
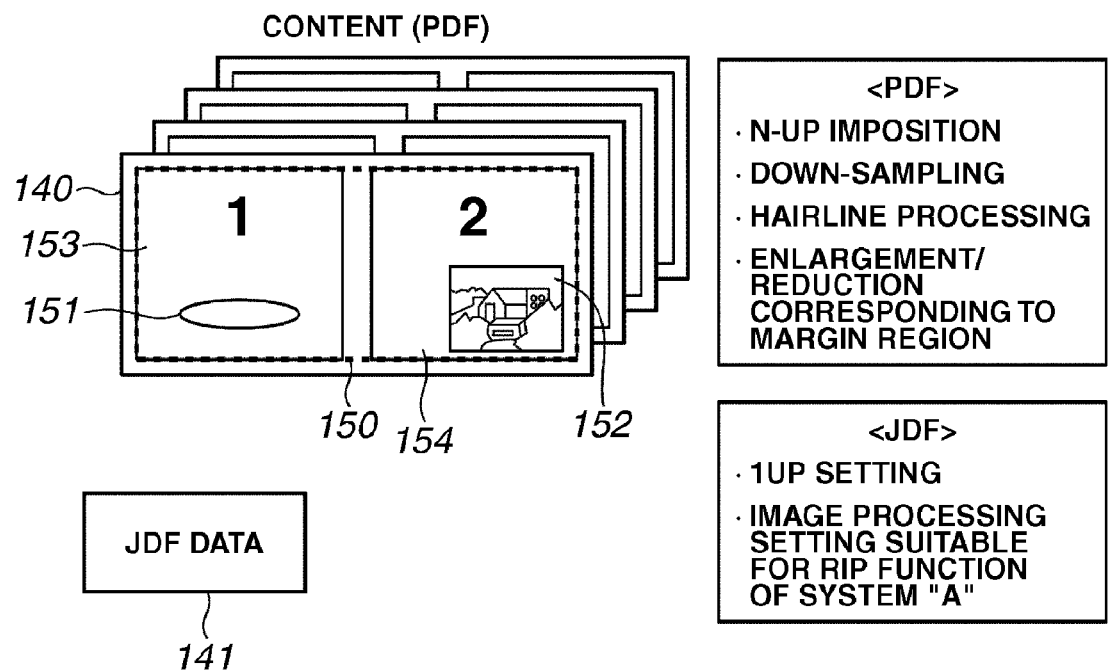
FIG. 17 illustrates practical PDF and job definition format (JDF) created in the system A shown in FIG. 14.

FIG. 17 illustrates practical PDF 140 and JDF 141 created by the prepress section 94 of the system A shown in FIG. 14.

In the present exemplary embodiment, the PDF 140 is an example of 2up PDF that includes logical pages 153 and 154 of the original PDF 142 disposed on the same page according to the two-imposition. The PDF 140 includes image data 152 which has been down-sampled so as to fit to the device resolution of the digital print section 92 in the system A.

Furthermore, the PDF 140 includes an elliptic shape 151 which has been subjected to the hairline processing so that no line of the elliptic shape 151 can be erased when printed by the device of the digital print section 92 in the system A.

The pages 153 and 154 are reduced (contracted) and disposed within a margin region 150 of the device of the digital print section 92 in the system A.

The JDF 141 and the PDF 140 are created, as a set of data, in the system A. The JDF 141 can include 1up setting of PDF 140 and RIP processing setting for the digital print section 92 in the system A.

FIG. 18 illustrates a practical structure of the job processing metadata 160 created by the job portal processing section 110 shown in FIG. 14.

In the present exemplary embodiment, the job portal processing section 110 can convert the JDF 141 transmitted from the system A into job processing metadata 160 (i.e., intermediate data) and can create the JDF 145 for the system B based on the job processing metadata 160.

The job processing metadata 160 includes a prepress (or pre-print processing) information section 161 that can store imposition information 165 and saddle stitch bookbinding information 166.

The imposition information 165 can include N-up information representing the imposition number (i.e., a total number of logical pages disposed on a piece of paper) and page layout order representing the order of pages disposed on the same paper.

The saddle stitch bookbinding information 166 can include saddle stitch bookbinding execution ON/OFF that indicates execution/non-execution of the saddle stitch bookbinding processing and creep information (i.e., creep value) that determines a clearance between neighboring pages to be subjected to the saddle stitch bookbinding processing. More specifically, the creep value is a width between logical pages disposed on the same physical page.

The job processing metadata 160 includes a press information section 162 that can store RIP information 167 and media information 168. The RIP information 167 can include a screening method. The media information 168 can include media (recording medium) size information including vertical and lateral dimensions and media type information representing the type of media.

The job processing metadata 160 includes a postpress (or post-press processing) information section 163 that can store stitch information 169 and cutting information 16a. The stitch information 169 can include stitch processing execution information that indicates execution/non-execution and stitch position. The cutting information 16a can include information designating a cutting region of a printed document (e.g., cutting position). The stitch information 169 can also include the type of stitch (e.g., two-stitch or four-stitch).

The job processing metadata 160 includes a common information section 164 that can store file information 16b. The file information 16b can include the PDF file location information (e.g., URL or PATH) that indicates the location of the PDF.

In the present exemplary embodiment, the job portal processing section 110 can execute reduction processing of the contents. Accordingly, the JDF for the system B can include non-related information. The job portal processing section 110 does not record the enlargement/reduction information in the job processing metadata. However, an enlargement/reduction rate of content and other information can be included in the job processing metadata.

The processing of the information (165-16b) in the information sections 161 to 163 can be executed according to order described in FIG. 18.

The creation of imposition information 165 shown in FIG. 18 will be described below with reference to FIGS. 19 and 20.

FIG. 19 illustrates a page layout of PDF 140 transmitted from the system A shown in FIG. 14 and a page layout of the original PDF 142.

In the present exemplary embodiment, the original PDF 142 is arranged by 1up and six pages. The PDF 140 from the system A is arranged by 4up and two pages.

The PDF 140 shown in FIG. 19 includes a leading page 170 and a succeeding page 1701, which include logical pages 171, 172, 173, 174, 179, and 17a obtainable through bookbinding processing.

Furthermore, the original PDF 142 includes individual pages 175, 176, 177, 178, 17b, and 17c respectively corresponding to logical pages. The page 175 is identical to the page 171. The page 176 is identical to the page 172. The page 177 is identical to the page 173. The page 178 is identical to the page 174. The page 17b is identical to the page 179. The page 17c is identical to the page 17a.

FIG. 20 is a flowchart showing a third control processing procedure in the integrated printing system in accordance with an exemplary embodiment. The flowchart of FIG. 20 corresponds to the processing of the job portal processing section 110 that creates the imposition information 165 of the job processing metadata 160 based on the original PDF 142 and PDF 140 processed in the prepress section 94 of the system A. To realize the processing of the flowchart shown in FIG. 20, the CPU 122 shown in FIG. 12 can load a program corresponding to steps S1 through S7 from the HD 12f into the PMEM 123 and can execute the readout program.

Before starting the flowchart, a print job (PDF 140 and JDF 141) is input from the system A, and the CPU 122 downloads the original PDF 142 from the file server 911 of the system A and stores the readout PDF 142 in the HD 12f.

First, in step S1, the CPU 122 reads leading page data 175 of the original PDF 142 into the PMEM 123. Next, in step S2, the CPU 122 selects an arbitrary PDF object from the leading page 175 and stores the selected PDF object into the PMEM 123. In the exemplary embodiment, the CPU 122 selects text data "A" from the leading page 175.

Then, in step S3, the CPU 122 extracts page number and position information of the object selected in step S2 in the PDF 140 of the system A and records the extracted number and information into the PMEM 123. In other words, the CPU 122 executes the processing for identifying a page of the PDF 140 (for the system A) where the object of the original PDF 142 is present.

Next, the processing flow proceeds to step S4, in which the CPU 122 determines whether the original PDF 142 contains next page data. When the next page data is present (YES in step S4), the processing flow proceeds to step S5.

Next, in step S5, the CPU 122 loads the next page data of the original PDF 142 into the PMEM 123. The processing flow returns to step S2.

If the next page data is not present (i.e., NO in step S4), the processing flow proceeds to step S6.

Next, in step S6, the CPU 122 determines the imposition number of the PDF 140 of the system A based on the information obtained in step S3, and stores, in the HD 12f, the N-up number as the imposition information 165 of the job processing metadata 160. Regarding the method for determining an N-up number, the CPU 122 can identify a relationship between the page layout on the PDF of the system A and corresponding pages on the original PDF 142 based on the page number information obtained in step S3.

More specifically, the CPU 122 can identify a relationship between each page of the original PDF 142 and a corresponding page number on the PDF 140 of the system A, to determine the imposition number, i.e., to determine how many pages (print data) are disposed on a piece of paper.

For example, according to the example shown in FIG. 19, the print data of first through fourth pages of the original PDF 142 constitutes a first page on the PDF 140 of the system A. The print data of fifth and sixth pages constitutes a second page on the PDF 140 of the system A. As a result, in step S6, the CPU 122 determines that the imposition number is 4 in 1 (which represents imposition of 4 pages of the original PDF 142 disposed on the same page on the PDF 140 of the system A).

In this case, it is useful to identify a "maximum number" of pages allowable in the imposition. More specifically, according to the example shown in FIG. 19, the PDF 140 of the system A includes a 4-imposition page 170 and a 2-imposition page 1701. If the decision in step S6 is made based on only the page 1701, the CPU 122 will erroneously recognize the page layout in the system A as 2-imposition. Accordingly, it is desirable for the CPU 122 to check the maximum page number allowable in the imposition, to accurately recognize the imposition number in step S6.

In short, when the CPU 122 creates processing contents of an item relating to the imposition information in FIG. 20, the CPU 122 can create the imposition information by recognizing the layout and the position of each page of original content data on the content data for the system A.

Then, the processing flow proceeds to step S7, in which the CPU 122 determines the imposition order based on the object position information obtained in step S3. First, the CPU 122 designates the first page (170) of the PDF of the system A as a page to be used in the decision of step S7, because the first page (170) includes the maximum number of pages. In other words, the second page (1701) is not used in the determination in step S7.

Then, the CPU 122 compares the layout order of pages in the original PDF, which arrange the designated page of the PDF of the system A for the decision in step S7, with the object position information stored in step S3.

Then, based on the comparison result, the CPU 122 determines the flow in the page layout arrangement and stores the imposition order determined using the XY-expression, in the HD 12f, as page layout order in the imposition information 165 of the job processing metadata 160.

More specifically, the XY-expression is any one of "xy", "Xy", "xY", "XY", "yx", "yX", "Yx", and "YX" that can define the imposition order, wherein a lowercase letter "x"

represents being disposed in the positive direction of the X-axis direction, and an uppercase letter "X" represents being disposed in the negative direction of the X-axis direction. Furthermore, a lowercase letter "y" represents being disposed in the positive direction of the Y-axis direction, and an uppercase letter "Y" represents being disposed in the negative direction of the Y-axis direction. The X-axis direction is equal to the horizontal direction (wherein the direction from left to right is positive). The Y-axis direction is equal to the vertical direction (wherein the direction from bottom to top is positive).

Furthermore, when the letter X(x) precedes the letter Y(y) (e.g., "xy", "Xy", "xY", and "XY"), the shifting order of the layout position starts in the X-axis direction. On the other hand, when the letter Y(y) precedes the letter X(x) (e.g., "yx", "yX", "Yx", and "YX"), the shifting order of the layout position starts in the Y-axis direction.

According to the example shown in FIG. 19, the imposition order of the first page 170 starts according to the page order in the positive direction of the X-axis direction (i.e., toward the right direction) and then the layout position is changed in the negative direction of the Y-axis direction (i.e., toward the downward direction). Namely, pages of the first page 170 are disposed from the upper left to lower right. Accordingly, the imposition order of the first page 170 can be expressed as "xY."

In the present exemplary embodiment, each page of the original PDF 142 can include not only a PDF object but also annotation data (e.g., "-1-" of the leading page 175) so that the imposition order of each page can be clearly understood on the PDF of the system A. Furthermore, the method for defining the imposition order is not limited to the XY-expression and any other method can be used in the present exemplary embodiment.

Next, with reference to the flowchart of FIG. 21, the processing for creating the RIP information 167 of the job processing metadata 160 will be described.

Figure 21:
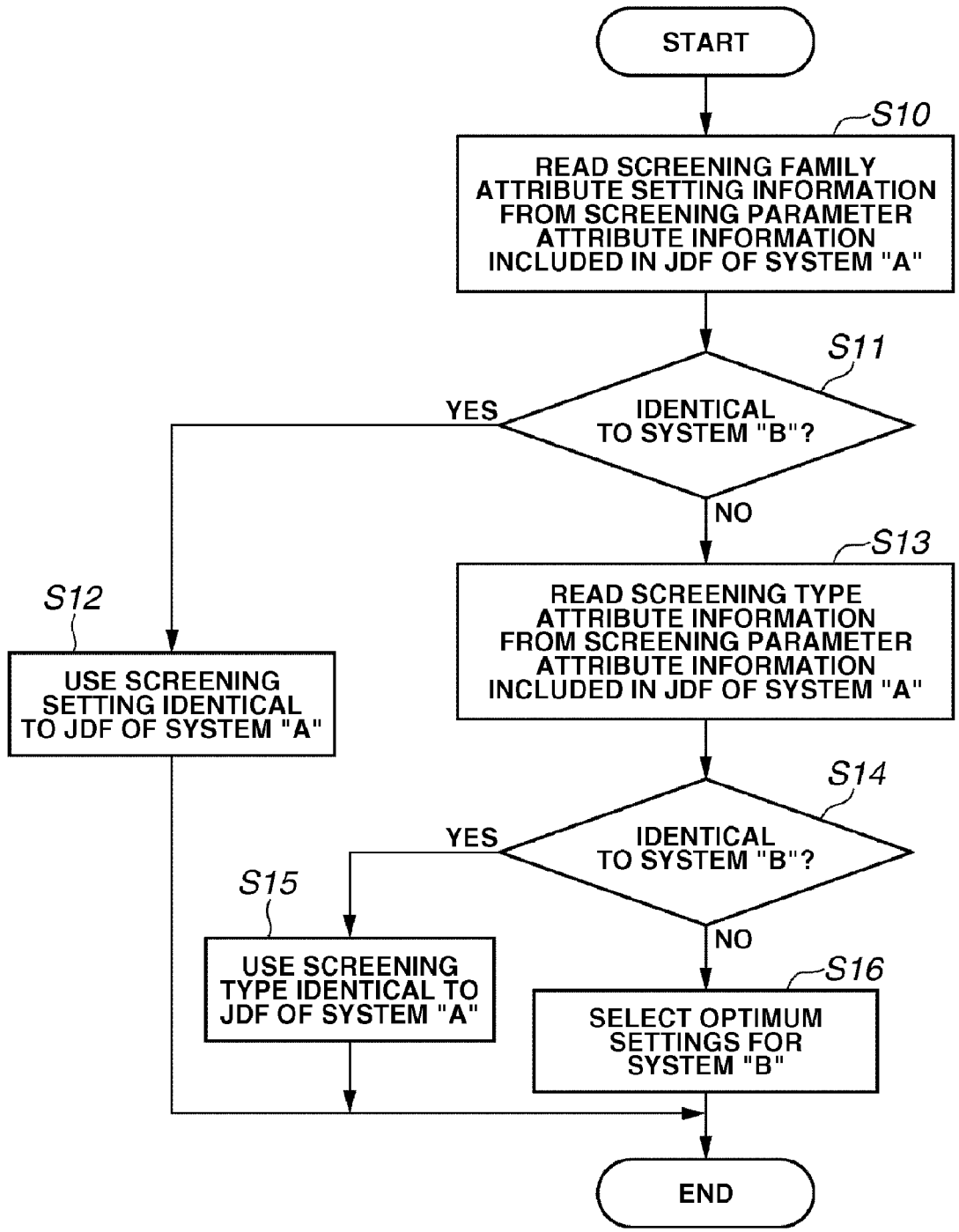
FIG. 21 is a flowchart showing a fourth control processing procedure in the integrated printing system in accordance with an exemplary embodiment.

FIG. 21 is a flowchart showing a fourth control processing procedure in the integrated printing system in accordance with an exemplary embodiment. The flowchart shown in FIG. 21 corresponds to the processing of the job portal processing section 110 that extracts the RIP information 167 from the job processing metadata 160. To realize the processing of the flowchart shown in FIG. 21, the CPU 122 shown in FIG. 12 can load a program corresponding to steps S10 through S16 from the HD 12*f* into the PMEM 123 and can execute the readout program.

First, in step S10, the CPU 122 extracts screening parameter attribute setting (representing screening processing parameters) from the JDF 141 transmitted from the system A and stores the extracted data in the PMEM 123. For example, the JDF 141 can include, as information relating to the screening processing parameters, device type information of the system A and screening method information (e.g., AM method or FM method).

The CPU 122 analyzes the JDF 141 transmitted from the system A and recognizes the information relating to the screening processing parameters. Furthermore, the CPU 122 extracts screening family attribute setting information from the screening parameter attribute information and stores the extracted information in PMEM 123. The screening family attribute setting information can be included in the information relating to the above-described screening processing parameters. Then, the processing flow proceeds to step S11.

Next, in step S11, the CPU 122 determines whether the system B has a screening function of a family identical to the screening family extracted in step S10 based on the above-described device function information (i.e., the entire capability of the process management section 4, the prepress section 7, the digital print section 5, and the postpress section 6 arranging the system B). At this moment, the job portal processing section 110 can request the print server 30 of the system B to transmit the device function information beforehand and can store the obtained information in the HD 12*f*.

When the system B has a screening function of the family identical to the screening family extracted in step S10 (i.e., YES in step S11), the processing flow proceeds to step S12. For example, when the type of a device executing the screening processing in the system A is identical to the type of a device executing the screening processing in the system B, the CPU 122 determines that the compared screening families are identical. However, any other method can be used for comparing the screening families.

In step S12, the CPU 122 determines that the system A and the system B can perform the same screening processing. Then, the CPU 122 stores the screening setting information identical to the JDF 141 of the system A in the HD 12*f*, as RIP information 167 of the job processing metadata 160, and terminates the processing of this routine.

If the system B has no screening function of the family identical to the screening family extracted in step S10 (i.e., NO in step S11), the processing flow proceeds to step S13.

Then, in step S13, the CPU 122 determines that the system A and the system B cannot perform the same screening processing. Then, the CPU 122 extracts screening type attribute information from the screening parameter attribute information included in the JDF 141 of the system A and stores the extracted information in the PMEM 123.

Furthermore, in step S14, the CPU 122 determines whether the system B has a screening function of a type identical to the screening type extracted in step S13. When the system B has the screening function of the same type (i.e., YES in step S14), the processing flow proceeds to step S15.

Then, in step S15, the CPU 122 determines that the system A and the system B do not have the same screening processing logic, while the CPU 122 determines that the system B has a screening function of similar type, such as AM/FM/Error Diffusion. Then, the CPU 122 instructs execution of screening processing similar in type to the JDF 141 of the system A. Therefore, the CPU 122 stores the screening type information for the system A in the HD 12*f*, as the RIP information 167 of the job processing metadata 160, and terminates the processing of this routine.

If the system B does not have the screening function of the same type (i.e., NO in step S14), the processing flow proceeds to step S16.

Then, in step S16, the CPU 122 determines that the system B cannot execute the processing according to the method designated by the JDF 141 of the system A. Then, the CPU 122 selects optimum processing for the PDF from screening functions executable in the digital print section 5 of the system B. In other words, the CPU 122 executes best effort processing according to the JDF spec.

For example, if the digital print section 5 of the system B has excellent FM screening performance for monochrome images and excellent AM screening performance for color images, the CPU 122 can instruct execution of FM screening for monochrome images and AM screening for color images with reference to the type of each PDF image in the RIP processing.

Then, the CPU 122 stores the information relating to the selected screening function in the HD 12*f*, as the RIP information 167 of the job processing metadata 160 (namely, perform the settings suitable for the system B). Then, the CPU 122 terminates the processing of this routine.

As described above, executing the processing of the flowchart shown in FIG. 21 enables a client to use the system B to execute the screening processing requested to the system A if the system B has the same screening family (i.e., YES in step S11), and also enables the client to use the system B to execute the processing similar to the screening processing requested to the system A if the system B has the same screen type (i.e., YES in step S14).

Moreover, the system B can perform optimum (best effort) screening processing with reference to the screening type(s) executable in the system B and PDF information, if the system B cannot execute the processing identical or similar to the screening type requested to the system A.

In short, the processing unexecutable by the system B, if included in a job ticket for the system A, can be replaced with similar type processing executable in the system B through the processing of FIG. 21. And, the job processing metadata for the system B can be created.

Thus, even when the processing of the system A is transferred to the system B, the CPU 122 can optimize the screening processing in the system B so as to realize the output requested by a client by executing the above-described stepwise processing.

Next, the method for setting the cutting information 16*a* shown in FIG. 18 will be described with reference to FIGS. 22 and 23.

Figure 22:
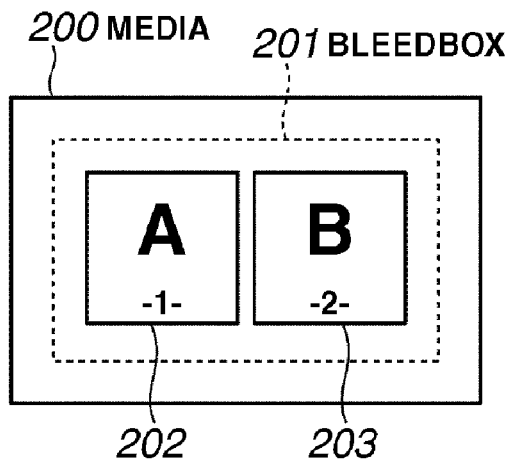
FIG. 22 illustrates a page layout of PDF transmitted from the system A shown in FIG. 14 and bleedbox information representing the paper cutting position.

FIG. 22 illustrates a page layout of PDF 140 transmitted from the system A shown in FIG. 14 and bleedbox information representing the paper cutting position, wherein the PDF 140 is arranged by 2up processing (i.e., two-imposition) The bleedbox information can designate the size and the position of an area to be cut off in the cutting processing.

As shown in FIG. 22, the PDF 140 of the system A includes an entire page 200 that includes bleedbox information 201 and logical pages 202 and 203. The logical pages 202 and 203 can constitute physical pages when finished by the bookbinding processing.

According to the example shown in FIG. 22, page number "1" is attached to the page 202 and page number "2" is attached to page 203. Thus, the logical pages 202 and 203 become first and second pages of a physical book obtainable through the bookbinding processing.

Figure 23:
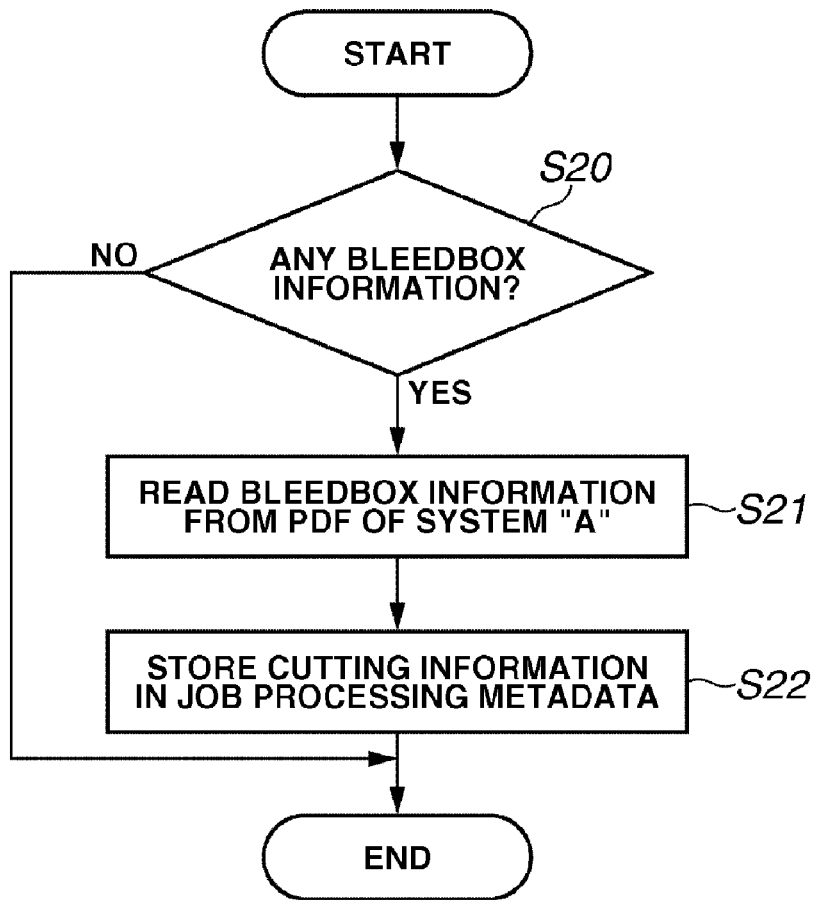
FIG. 23 is a flowchart showing a fifth control processing procedure in the integrated printing system in accordance with an exemplary embodiment.

FIG. 23 is a flowchart showing a fifth control processing procedure in the integrated printing system in accordance with an exemplary embodiment. The flowchart shown in FIG. 23 corresponds to the processing of the job portal processing section 110 that creates cutting information 16*a* of job processing metadata 160 based on the PDF 140 processed in the prepress section 94 of the system A. To realize the processing of the flowchart shown in FIG. 23, the CPU 122 shown in FIG. 12 can load a program corresponding to steps S20 through S22 from the HD 12*f* into the PMEM 123 and can execute the readout program.

First, in step S20, the CPU 122 determines whether a leading page involved in the PDF 140 of the system A has bleedbox information. If the leading page has no bleedbox information (i.e., NO in step S20), the CPU 122 terminates the processing of this routine. The PDF can include information designating paper cutting size, such as cutting positions and dimensions. The CPU 122 can execute the determination processing of step S20 based on the paper cutting size information obtainable from the PDF 140 of the system A.

On the other hand, when the leading page of the PDF 140 has bleedbox information (i.e., YES in step S20), the processing flow proceeds to step S21 wherein the CPU 122 reads the bleedbox information from the leading page of the PDF 140.

Then, in step S22, the CPU 122 stores the cutting information (position and dimensions) obtained from the bleedbox information in the HD 12*f*, as the cutting information 16*a* of the job processing metadata 160, and terminates the processing of this routine.

Although the present exemplary embodiment sets the paper cutting information 16*a* based on only the bleedbox information of a leading page of the PDF 140 of the system A, an exemplary embodiment can identify bleedbox information for each page of the PDF 140 and record the paper cutting information of each page in the paper cutting information 16*a*.

By executing the processing of FIG. 23, the JDF for the system B can include paper cutting information obtained from the PDF. More specifically, paper cutting information of the JDF created for the system A is information described for a paper cutting machine of the system A. However, a paper cutting position (included in the paper cutting information) may be "2 cm from right and left edges" or "3 cm from upper and lower edges" which is equally applicable to a paper cutting machine of the system B. Accordingly, in FIG. 23, paper cutting information of the system A can be applied to the system B. Furthermore, if desirable to avoid any problem, it is useful to adjust the paper cutting information with reference to function information for the system B.

Next, the method for setting the saddle stitch bookbinding information 166 shown in FIG. 18 will be described with reference to FIGS. 24 and 25.

FIG. 24 illustrates a page layout of the PDF 140 transmitted from the system A and cropbox information representing a drawing region of a content object on each page of the PDF. According to the example shown in FIG. 24, the PDF 140 from the system A is arranged by 2UP processing (i.e., 2-imposition).

As shown in FIG. 24, the PDF 140 from the system A includes a first page 220, a second page 222, and a third page 224.

The first page 220 includes a cropbox 221, the second page 222 includes a cropbox 223, and the third page 224 includes a cropbox 225.

The cropbox represents a drawing region of a PDF object. The creep processing is required when the prepress section 94 of the system A creates imposition-processed PDF in a final printout state. For example, if the imposition-processed PDF is created as shown in FIG. 24, the clearance between two logical pages is changed according to a creep value and, accordingly, the cropbox value must be changed according to the creep value.

For example, it is now supposed that bookbinding processing is performed for folding output products printed by 2 in 1 imposition. In this case, an outer physical page wraps inner physical pages. Therefore, if the gap between logical pages disposed on the outer physical page is narrow, the logical pages may not be opened at inner parts along the central folding line when the outer physical page is bookbinding-processed.

The creep processing can overcome the above-described problem. More specifically, the creep processing is processing for widening the clearance between logical pages of an outer physical page. The creep value represents an offset value in the creep processing.

Figure 25:
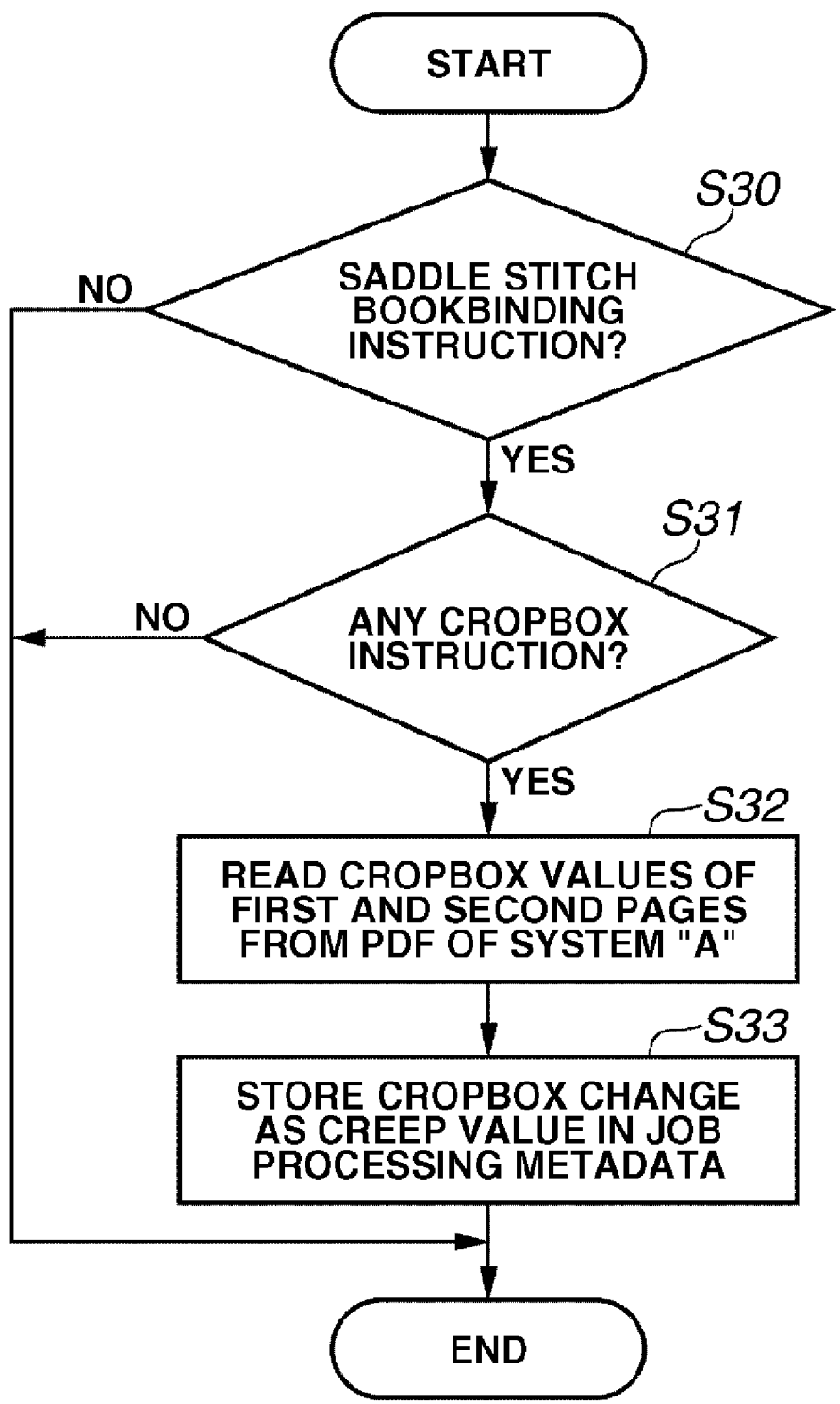
FIG. 25 is a flowchart showing a sixth control processing procedure in the integrated printing system in accordance with an exemplary embodiment.

FIG. 25 is a flowchart showing a sixth control processing procedure in the integrated printing system in accordance with an exemplary embodiment. The flowchart shown in FIG. 25 corresponds to the processing of the job portal processing section 110 that creates the saddle stitch bookbinding information 166 of the job processing metadata 160 based on the PDF 140 processed in the prepress section 94 of the system A. To realize the processing of the flowchart shown in FIG. 25, the CPU 122 shown in FIG. 12 can load a program corresponding to steps S30 through S33 from the HD 12f into the PMEM 123 and can execute the readout program.

First, in step S30, the CPU 122 determines whether the JDF 141 of the system A includes a saddle stitching process instruction. If the JDF 141 includes no saddle stitching process instruction (i.e., NO in step S30), the CPU 122 stores information expressing no execution of saddle stitching bookbinding processing (saddle stitch bookbinding execution OFF) in the HD 12f, as the saddle stitch bookbinding information 166 of the job processing metadata 160. Furthermore, the CPU 122 stores information indicating saddle stitch execution OFF, in the HD 12f, as the saddle stitch execution ON/OFF information of the job processing metadata 160. Then, the CPU 122 terminates the processing of this routine.

When the JDF 141 of the system A includes the saddle stitching process instruction (i.e., YES in step S30), the CPU 122 stores information indicating execution ON of the saddle stitch bookbinding processing, in the HD 12f, as the job processing metadata 160. Furthermore, the CPU 122 stores information indicating saddle stitch execution ON, in the HD 12f, as the saddle stitch execution ON/OFF information of the job processing metadata 160. Then, the processing flow proceeds to step S31.

Next, in step S31, the CPU 122 determines whether the PDF 140 of the system A includes a cropbox instruction on a leading page. If no cropbox instruction is included (i.e., NO in step S31), the CPU 122 terminates the processing of this routine. More specifically, the PDF can include drawing region information (e.g., drawing position and drawing size) for each page. Thus, the CPU 122 can identify a cropbox (i.e., a drawing region) based on analysis of the PDF 140 to be processed.

On the other hand, when a cropbox instruction is included in the PDF 140 of the system A (i.e., YES in step S31), the processing flow proceeds to step S32.

Next, in step S32, the CPU 122 extracts cropbox values of the first and second pages from the PDF 140 of the system A and stores the obtained values in the PMEM 123.

Next, in step S33, the CPU 122 calculates a difference of cropbox values of the first and second pages. Then, the CPU 122 stores a calculated difference in the HD 12f, as a creep value of the saddle stitch bookbinding information 166 of the job processing metadata 160, and terminates the processing of this routine.

The system B can create content data for the system B based on information of the original PDF 142. However, no creep processing is applied to the original PDF 142. If imposition processing, print processing, and saddle stitch processing are performed, the above-described problem (i.e., the problem of causing logical pages having unopenable regions along the central folding line) will arise. Hence, it is useful to use the PDF 140 of the system A to which the creep processing is already applied for the saddle stitch print processing, when the processing of step S33 is executed.

Namely, in FIG. 25, the CPU 122 determines whether the saddle stitch processing should be executed based on the job ticket for the system A. Then, when the job ticket for the system A includes the settings for the saddle stitch processing, the CPU 122 determines a drawing region of each page with respect to the content data for the system B based on drawing region information of the content data for the system A. The CPU 122 can describe drawing region information determined with respect to an item relating to the post-print processing.

As described above, the cropbox is measured based on the leading page and the next page of the PDF 140 created in the system A. However, in the case of saddle stitch bookbinding processing, the leading page of the PDF 140 may be a cover slip page and the body of the book may start with the second page. In such a case, the CPU 122 can identify a front page in the PDF 140 based on cover application process information obtainable from the JDF 141 of the system A. Then, the CPU 122 can determine creep value information stored in the saddle stitch bookbinding information 166 so as to skip recording a creep value on the cover slip page.

Through the processing of the flowcharts shown in FIGS. 20, 21, 23, and 25, the imposition information 165, the RIP information 167, the cutting information 16a, the saddle stitch bookbinding information 166, and the stitch information 169 are stored as the job processing metadata 160. Although not shown in the flowchart, the CPU 122 can extract the media information 168 from the JDF 141 of the system A and store the extracted information as job processing metadata 160. Furthermore, the CPU 122 can store URL or PATH (full path) information indicating the storage location of the original PDF as file information 164 of the job processing metadata 160. Through the above-described processing, the job processing metadata 160 can be created.

Figure 26:
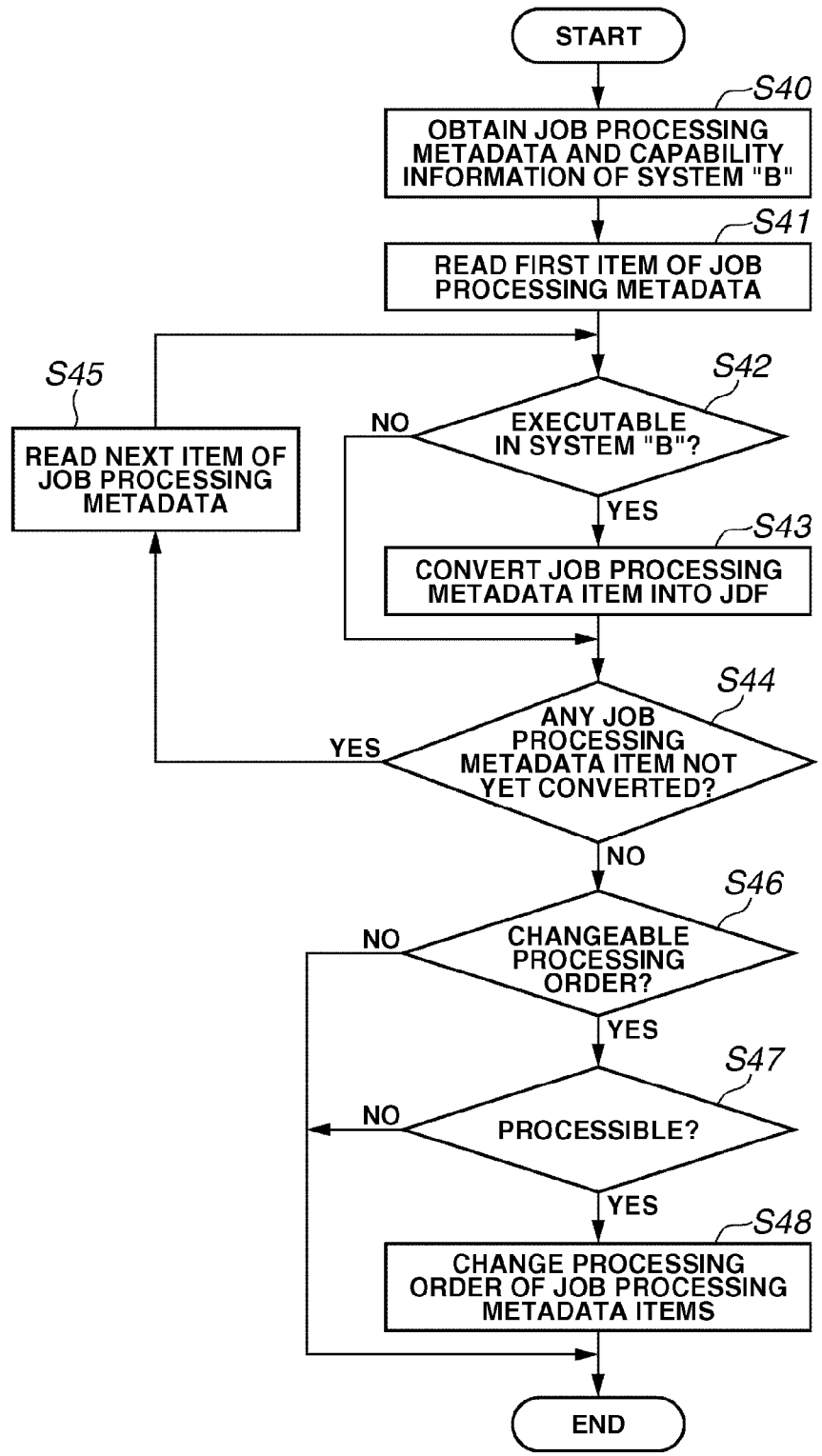
FIG. 26 is a flowchart showing a seventh control processing procedure in the integrated printing system in accordance with an exemplary embodiment.

FIG. 26 is a flowchart showing a seventh control processing procedure in the integrated printing system in accordance with an exemplary embodiment. The flowchart shown in FIG. 26 corresponds to the processing of the job portal processing section 110 that creates the JDF 145 for the system B based on the job processing metadata 160. To realize the processing of the flowchart shown in FIG. 26, the CPU 122 shown in FIG. 12 can load a program corresponding to steps S40 through S48 from the HD 12f into the PMEM 123 and can execute the readout program.

First, in step S40, the CPU 122 of the job portal processing section 110 obtains the job processing metadata 160 and the device function information of the system B (entire capability). In other words, the CPU 122 obtains the capability information of the process management section 4, the prepress section 7, the digital print section 5, and the postpress section 6, which constitute the system B. For example, the job portal processing section 110 can request the print server 30 of the system B to transmit the capability information. Furthermore, the CPU 122 can read the job processing metadata 160 from the PMEM 123.

Next, in step S41, the CPU 122 reads, into the PMEM 123, a first item of the job processing metadata 160. For example, according to the example shown in FIG. 18, the CPU 122 obtains the prepress (or pre-print processing) information section 161 including the imposition information 165 and the saddle stitch bookbinding information 166.

In step S42, the CPU 122 determines whether the system B has a function corresponding to the item read from the job processing metadata 150 in step S41 based on the device function information of the system B read in step S40.

When the item read from the job processing metadata 150 in step S41 is executable in the system B (i.e., YES in step S42), the processing flow proceeds to step S43.

Next, in step S43, the CPU 122 determines that the system B can execute similar processing using the parameters of the system A. Accordingly, the CPU 122 creates JDF for the system B describing the information relating to the item of the job processing metadata read in step S41 and stores the created JDF in the PMEM 123. Then, the processing flow proceeds to step S44. In the conversion of the data corresponding to the imposition information 165 into the JDF, the N-up number is set to "1" (to create N-up PDF for the system B).

If the system B has no function corresponding to the item read from the job processing metadata 150 in step S41 (i.e., NO in step S42), the processing flow proceeds to step S44. Namely, the CPU 122 determines that the system B cannot execute similar processing using the parameters of the system A. At this moment, no parameters are described in the JDF for the system B. Each item, processed in step S42, can be discriminated by a flag indicating accomplishment of the JDF conversion.

Next, in step S44, the CPU 122 determines whether any item not yet converted into the JDF for the system B is present in the job processing metadata 160. If there is a non-converted item (i.e., YES in step S44), the processing flow proceeds to step S45.

Then, in step S45, the CPU 122 reads, into the PMEM 123, a next item of the job processing metadata 160. Then, the processing flow returns to step S42.

When there is no non-converted item (i.e., NO in step S44), the processing flow proceeds to step S46.

Next, in step S46, the CPU 122 determines whether the processing order is changeable for the item not converted into the JDF of the system B (i.e., the item not subjected to the processing of step S43). Details of step S46 will be described later.

If the processing order is unchangeable (i.e., NO in step S46), the CPU 122 terminates the processing of this routine.

When the processing order is changeable (i.e., YES in step S46), the processing flow proceeds to step S47.

Next, in step S47, the CPU 122 determines whether the system B can execute the processing according to the changed order. If the processing order change is not acceptable by the system B (i.e., NO in step S47), the CPU 122 terminates the processing of this routine.

When the processing order change is acceptable by the system B (i.e., YES in step S47), the processing flow proceeds to step S48.

Next, in step S48, the CPU 122 modifies the JDF for the system B so as to include the items of the job processing metadata 160 according to the changed processing order. Then, the CPU 122 terminates the processing of this routine.

According to the above-described exemplary embodiment, the processing of steps S46 and S47 shown in FIG. 26 presents only one example (changeable order) for the item not converted into the JDF of the system B. However, it is useful to create plural candidates with respect to the changeable order and determine whether the system B can execute the processing according to each candidate (changeable order). In this case, it is useful to perform conversion of the JDF based on a first found candidate (changeable order).

Furthermore, in the case of creating plural candidates (changeable orders) and determining whether the system B can execute the processing according to each candidate (changeable order), it is useful to give a priority order to each of the created plural candidates (changeable orders) considering the processing cost and processing performances in the system B.

FIGS. 27 to 30 show a practical example relating to the processing in steps S46 through S48 of the flowchart shown in FIG. 26 (i.e., the processing for creating JDF for the system B that can obtain a final output product similar to the result of the system A by changing the processing order).

It is now assumed that the system A creates JDF to produce an output shown in FIG. 10.

Furthermore, it is supposed that the postpress section 93 in the system A includes a device capable of performing four-stitch processing, while the postpress section 6 of the system B includes a device capable of only performing two-stitch processing.

In this case, if the JDF 141 includes instructions of "four-stitch" and "cutting in the central region", the system B cannot execute the four-stitch processing when the JDF 141 is transmitted from the system A to the job portal processing section 110.

In the present exemplary embodiment, the JDF for the system B capable of obtaining a final output product similar to the result of the system A can be created by changing the processing order and settings in the following manner.

Figure 27:
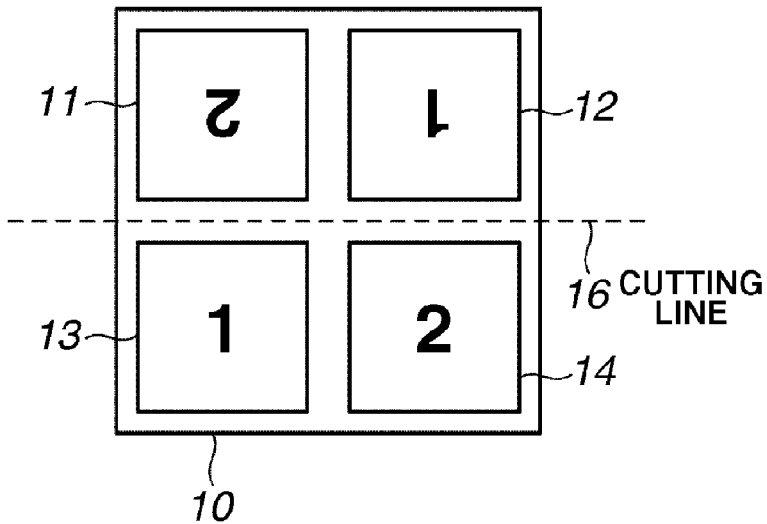
FIG. 27 illustrates an example different from the example shown in FIG. 10 in that four stitches are removed.

FIG. 27 illustrates an example different from the example shown in FIG. 10 in that the four stitch positions 15 are removed, wherein components similar to those illustrated in FIG. 10 are denoted by the same reference numerals.

It is supposed that the system B and the system A have the same functions except for the stitch processing function. Therefore, the system B can print four logical pages 11, 12, 13, and 14 disposed on an A2-size document 10 as shown in FIG. 27 and can cut the A2-size document along the center line 16.

Figure 28:
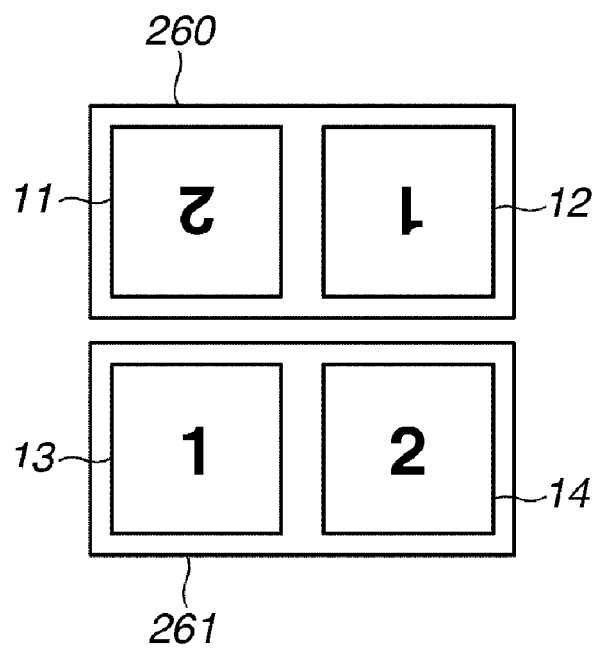
FIG. 28 illustrates two pieces of paper obtainable when the A2-size document shown in FIG. 27 is cut along a center line.

FIG. 28 illustrates two pieces of paper, i.e., an upper A3-size document 260 and a lower A3-size document 261, obtainable when the A2-size document 10 shown in FIG. 27 is cut along the center line 16, wherein components similar to those illustrated in FIG. 27 are denoted by the same reference numerals.

Figure 29:
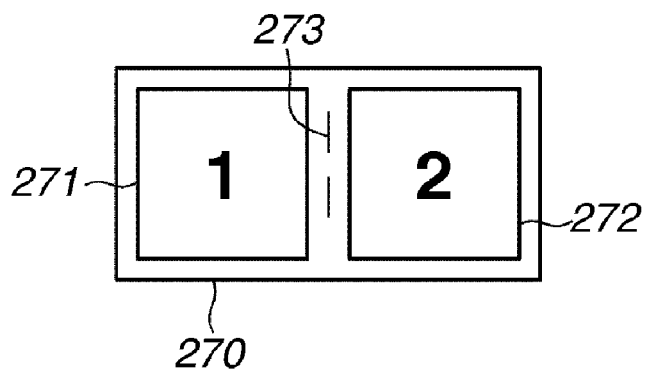
FIG. 29 illustrates documents which are stitched at two portions.

FIG. 29 illustrates documents 270 (i.e., A3-size documents 260 and 261 shown in FIG. 28) which are stitched at two portions 273.

In FIG. 29, a logical page 271 is identical to the logical pages 12 and 13 shown in FIG. 28 and a logical page 272 is identical to the logical pages 11 and 14 shown in FIG. 28.

Figure 30:
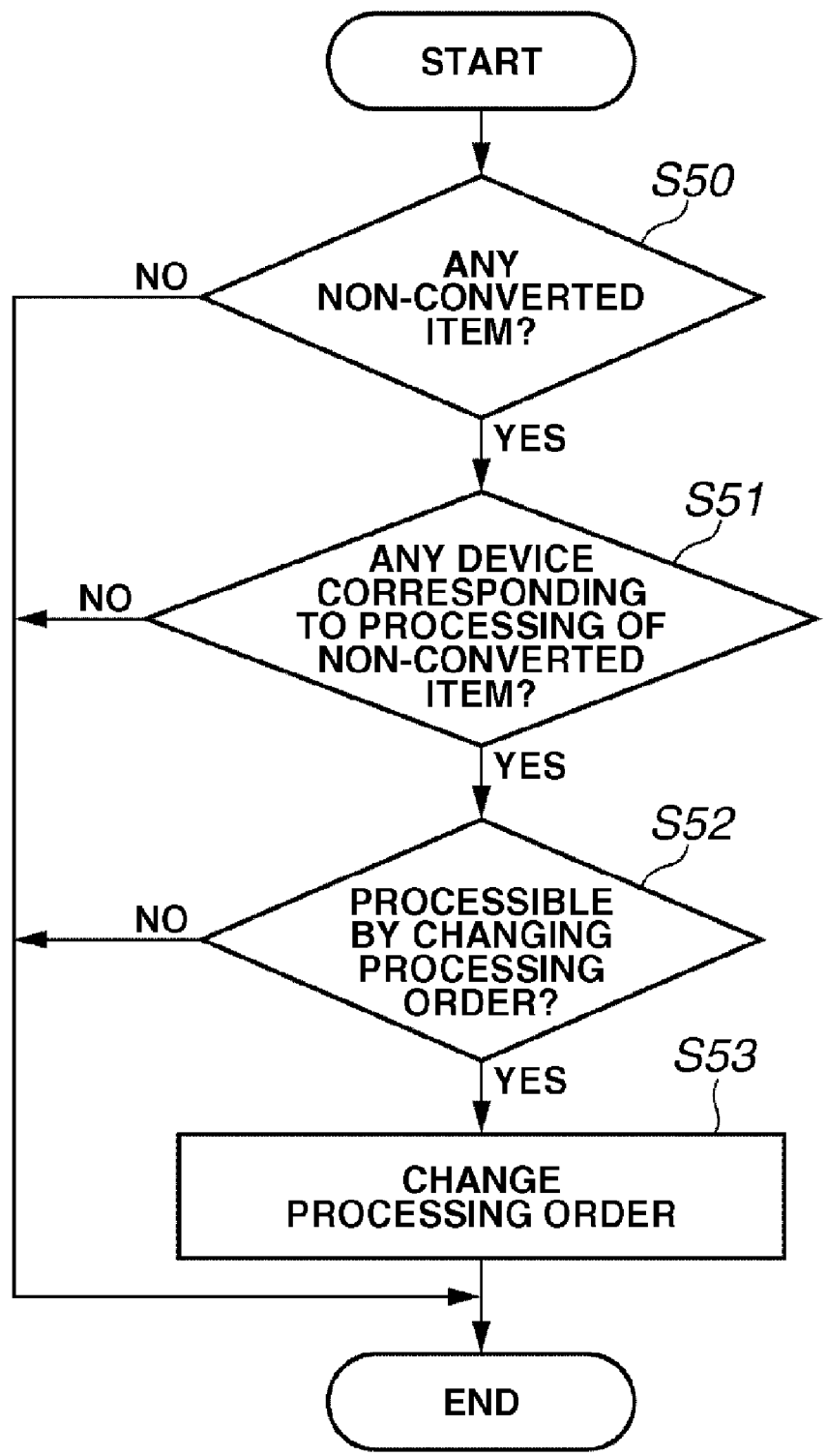
FIG. 30 is a flowchart showing an eighth control processing procedure in the integrated printing system in accordance with an exemplary embodiment.

FIG. 30 is a flowchart showing an eighth control processing procedure in the integrated printing system in accordance with an exemplary embodiment. The flowchart shown in FIG. 30 corresponds to the processing for creating JDF processible in the system B by changing the processing order of "stitch" and "cutting" processing, and also corresponds to processing of steps S46 to S48 of FIG. 26. To realize the processing of the flowchart shown in FIG. 30, the CPU 122 shown in FIG. 12 can load a program corresponding to steps S50 through S53 from the HD 12f into the PMEM 123 and can execute the readout program.

First, in step S50, the CPU 122 determines whether there is any non-converted JDF item. As described above, the CPU 122 can discriminate each item of the job processing metadata 160 using the flag indicating accomplishment of the JDF conversion. Thus, the CPU 122 can identify the non-converted item(s) with reference to their flags.

Subsequently, in step S51, the CPU 122 determines whether there is any device that can execute processing attribute of the non-converted item. For example, according to the example shown in FIGS. 27 through 29, the CPU 122 can recognize, based on flag information, that the stitch information item 169 of the job processing metadata 160 is a non-converted item. The processing performed in step S51 is for confirming the presence of a device (i.e., stitch processing machine) in the system B that can execute the processing relating to the non-converted item (i.e., stitch information)

When the device that can execute processing attribute of the non-converted item is present (i.e., YES in step S51), the CPU 122 determines whether the non-converted item can be processed by changing the processing order (refer to step S52).

As described above, the system B does not include a device capable of performing the four-stitch processing. However, the system B includes a device capable of performing two-stitch processing. In such a case, the CPU 122 can change the processing order to enable the system B to perform two-stitch processing. Namely, the sheets are cut into half-size sheets (physical pages) before the system B starts two-stitch processing.

When the non-converted item can be processed by changing the processing order (i.e., YES in step S52), the CPU 122 creates JDF described according to the changed processing order (refer to step S53).

Through the above-described processing of FIG. 30, the CPU 122 can change the order of processing items included in the job processing metadata, if the job processing metadata includes a processing item unexecutable in the system B, so that the system B can execute all of the processing items. Then, the CPU 122 converts the job processing metadata into a job ticket corresponding to the system B based on the changed order.

Thus, the example shown in FIGS. 27 through 29 can obtain a final output product similar to the result obtainable from the processing shown in FIG. 10.

Although an A2-size document 10 is cut into A3-size documents in the above-described exemplary embodiment, it is also useful to obtain a similar final output product by performing printing on A3-size documents and then performing the stitch processing.

Although the processing order of "stitch" and "paper cutting" processing is changed to create JDF processible in the system B in the above-described exemplary embodiment, a similar effect will be obtained even when the processing order of other items is changed.

The processing for creating PDF optimized for the system B will be described with reference to FIG. 31.

Figure 31:
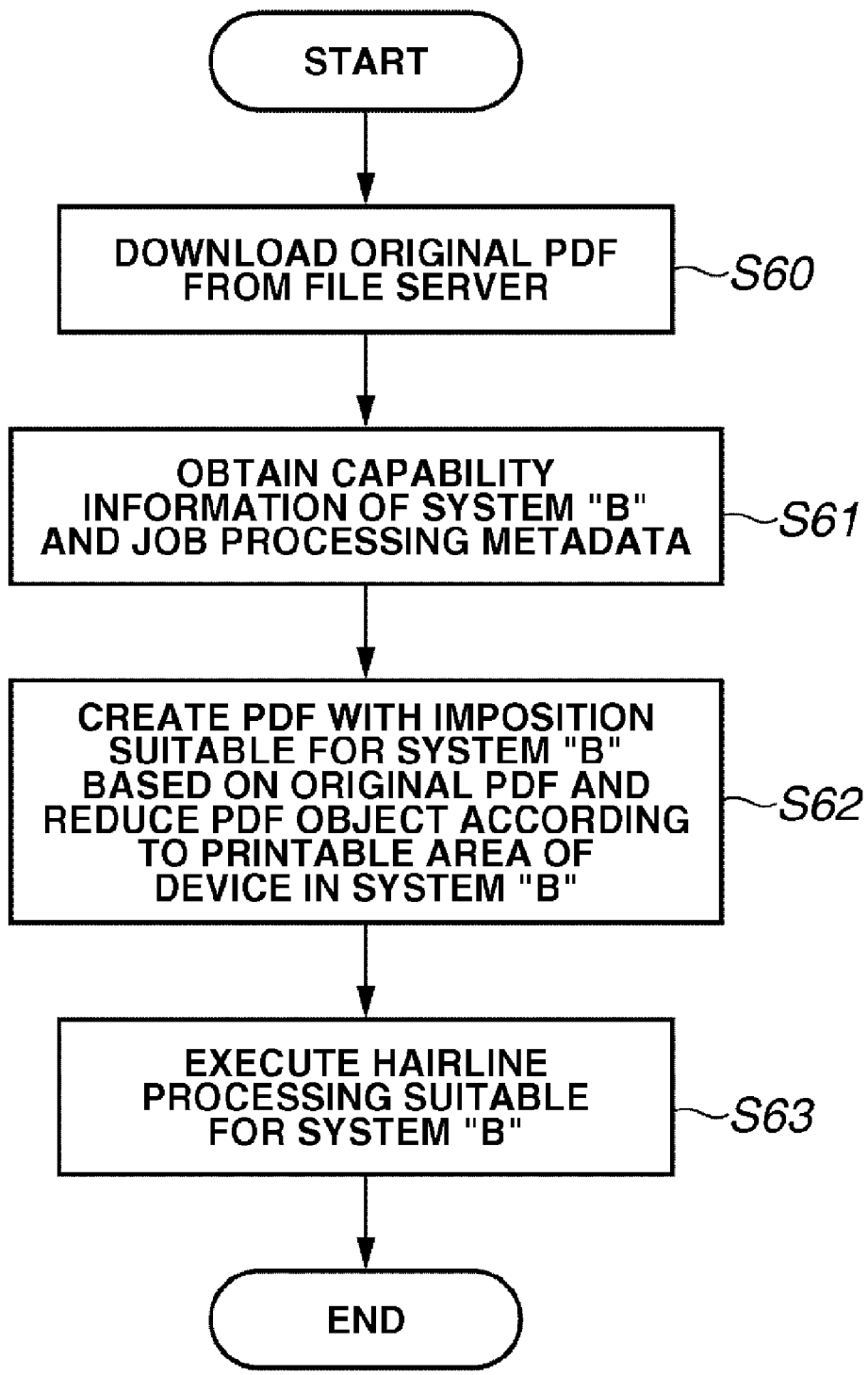
FIG. 31 is a flowchart showing a ninth control processing procedure in the integrated printing system in accordance with an exemplary embodiment.

FIG. 31 is a flowchart showing a ninth control processing procedure in the integrated printing system in accordance with an exemplary embodiment. The flowchart of FIG. 31 corresponds to the processing for creating PDF optimized for the system B according to the present exemplary embodiment. To realize the processing of the flowchart shown in FIG. 31, the CPU 122 shown in FIG. 12 can load a program corresponding to steps S60 through S63 from the HD 12f into the PMEM 123 and can execute the readout program.

First, in step S60, the CPU 122 downloads the original PDF 142 from the file server 911 of the system A. The CPU 122 can perform the download processing beforehand.

Then, in step S61, the CPU 122 reads, into the PMEM 123, capability information of the system B and the job processing metadata 160 created by the job portal processing section 110.

Next, in step S62, the CPU 122 obtains the imposition information 165 recorded in the job processing metadata 160 and device resolution of the digital print section 5 obtainable from the capability information of the system B.

Then, the CPU 122 down-samples the image data so as to have the resolution identical to the device of the digital print section 5 in the system B, based on the imposition information 165 and the device resolution of the digital print section 5. In addition, the CPU 122 creates PDF for the system B including pages arranged according to the designated imposition.

In this case, if an object of the PDF extends widely into or over the margin area of the digital print section 5 of the system B, the CPU 122 can reduce the size of each object of the PDF so that the entire object can be properly arranged relative to the margin area of the digital print section 5.

Next, in step S63, the CPU 122 executes hairline processing based on the device resolution of the digital print section 5 obtained in step S61 and a line width calculation method so that no line can be erased when printed by the device of the digital print section 5.

Then, the CPU 122 terminates the processing of this routine.

In the present exemplary embodiment, the creation of the PDF for the system B is subjected to the following three problems:
(1) Quality problem caused due to down-sampling processing applied to image data of the PDF;
(2) Unprintable problem caused due to a difference between margin region sizes of digital print devices; and
(3) Hairline problem caused due to a difference between resolution of a digital print device and the RIP logic.

However, it is useful to create PDF for the system B so as to solve any problems other than the above-described items (1) through (3). Namely, the present exemplary embodiment can be employed to create PDF for the system B based on the difference between the digital print devices in the system A and the system B.

Although the processing of FIG. 31 is for creating PDF based on capability information of the system B and job processing metadata, it is also useful to create JDF for the system B first and then create PDF suitable for the JDF for the system B.

By executing the above-described processing of FIG. 19, the CPU 122 can apply image processing to the original content data based on the device function information in the system B and job processing metadata and can create content data for the system B.

Furthermore, the CPU 122 can perform imposition processing using the original content data based on the job processing metadata and the device function information of the system B and can create content data for the system B.

Furthermore, the CPU 122 can apply resolution conversion processing, hairline processing, and reduction processing to the original content data based on the device function information in the system B and can create content data for the system B.

Next, the processing for transferring a print job from the system A shown in FIG. 14 to the system B will be described with reference to the flowchart of FIG. 32.

Figure 32:
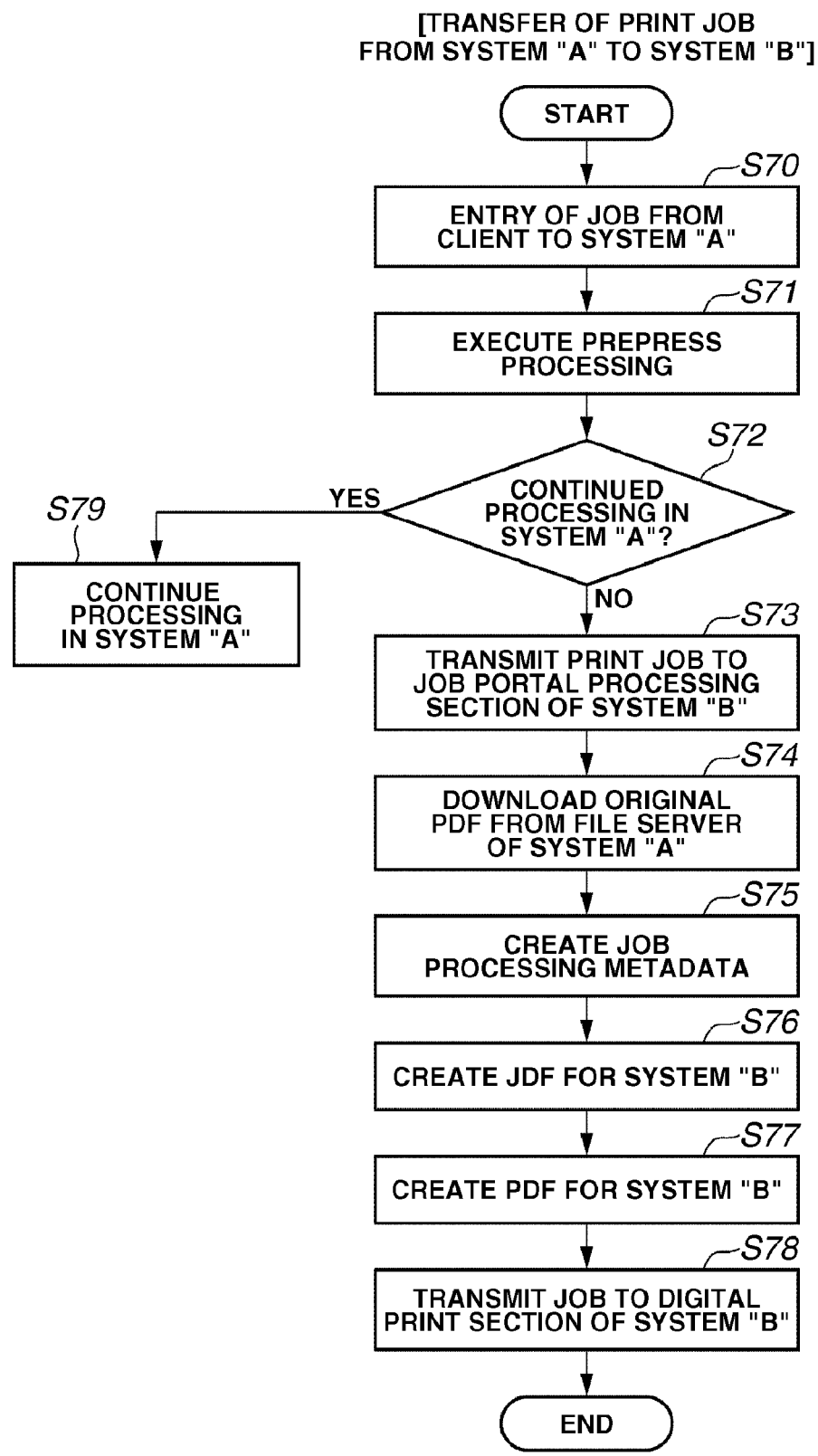
FIG. 32 is a flowchart showing a tenth control processing procedure in the integrated printing system in accordance with an exemplary embodiment.

FIG. 32 is a flowchart showing a tenth control processing procedure in the integrated printing system in accordance with an exemplary embodiment. The flowchart of FIG. 32 corresponds to the processing for transferring a print job from the system A to the system B. The processing of steps S70-S73 and S79 in the flowchart corresponds to the processing executed by the device of the system A shown in FIG. 11. The CPU 122 shown in FIG. 12 can load a program corresponding to steps S74 through S78 from the HD 12f into the PMEM 123 and can execute the readout program.

First, a client inputs a job into the system A, and content data (PDF) and work instructions (JDF) are transmitted from the end-user environments 1 and 2 to the order-receiving server of the process management section 91 in the system A.

Next, in step S70, the order-receiving server of the process management section 91 in the system A receives the job entered by the client and the file server 911 (FIG. 14) stores the PDF data included in the job. Then, the JDF included in the job is transmitted to the MIS server of the process management section 91. Then, the MIS server of the system A creates JDF for the system A based on the work instructions described in the JDF.

Next, in step S71, the MIS server of the system A transmits the JDF to the prepress section 94 of the system A to start the prepress processing in the system A. Then, the prepress server of the prepress section 94 in the system A identifies the PDF stored in the file server based on location information of the PDF described in the received JDF, and downloads the PDF from the prepress server. In this respect, the processing of step S71 corresponds to the flow number (1) in FIG. 14.

Next, according to the information described in the JDF, the prepress server of the system A applies prepress processing (e.g., imposition processing, hairline processing, enlargement/reduction, and down-sampling of image data) to the PDF. Then, after accomplishing the prepress processing, the prepress server of the system A notifies the MIS server of the process management section 91 of accomplishment of the processing.

Next, in step S72, the MIS server of the system A determines whether the next processing is continuously executed in the digital print section 92 of the system A. When the system A continues the processing (i.e., YES in step S72), the processing flow proceeds to step S79. The MIS server of the system A transmits the JDF and the PDF to the digital print section 92 in the system A and processing is continued in the system A.

On the other hand, if the system A does not execute continued processing (i.e., NO in step S72), the processing flow proceeds to step S73. For example, the system A does not execute continued processing when the device of the digital print section 92 is damaged or malfunctioned or when the job processing is delayed due to many jobs to be processed. In this case, the MIS server of the system A requests the system B to perform continued processing of the print job.

Next, in step S73, the MIS server in the process management section 91 of the system A instructs the prepress server to transmit the print job to the job portal processing section 110 of the system B. Then, the prepress server in the prepress section 94 of the system A transmits the print job (i.e., JDF) and the PDF processed in the prepress section to the job portal processing section 110. In this respect, the processing of step S73 corresponds to the flow number (2) in FIG. 14.

The job portal processing section 110 executes the following processing.

The CPU 122 of the job portal processing section 110 receives the print job (JDF and PDF) from the prepress server of the prepress section 94 in the system A. Then, the processing flow proceeds to step S74.

In step S74, the CPU 122 of the job portal processing section 110 determines, based on the received JDF, that the original PDF is stored in the file server 22 of the system A. Then, the CPU 122 of the job portal processing section 110 downloads the original PDF 142 from the file server 22 of the system A to the job portal processing section 110. In this respect, the processing of step S74 corresponds to the flow number (3) in FIG. 14.

Next, in step S75, the CPU 122 of the job portal processing section 110 creates job processing metadata 160 as pre-processing for creating JDF for the system B. In this respect, the processing of step S75 also corresponds to the flow number (3) in FIG. 14. As already described, FIGS. 18 through 25 illustrate creation of the job processing metadata 160.

Next, in step S76, the CPU 122 of the job portal processing section 110 creates the JDF for the system B. In this respect, the processing of step S76 corresponds to the flow number (4) in FIG. 14. Furthermore, FIGS. 26 through 30 illustrate creation of the JDF for the system B.

Next, in step S77, the CPU 122 of the job portal processing section 110 creates the PDF for the system B. In this respect, the processing of step S77 also corresponds to the flow number (4) in FIG. 14. Furthermore, FIG. 31 illustrates creation of the PDF.

Next, in step S78, the CPU 122 of the job portal processing section 110 transmits the created JDF 145 and the PDF 144 to the print server 30 in the digital print section 5 of the system B. In this respect, the processing of step S78 corresponds to the flow number (5) in FIG. 14. Then, the CPU 122 terminates the processing of this routine.

As a result of the above-described processing, each device of the system B can perform the processing based on the JDF and the PDF which are created by the job portal processing section 110 for the system B. In other words, the output product similar to the final output product to be obtained from the system A can be automatically produced by the system B without requiring any assistance by a worker.

Other Exemplary Embodiments

Figure 33:
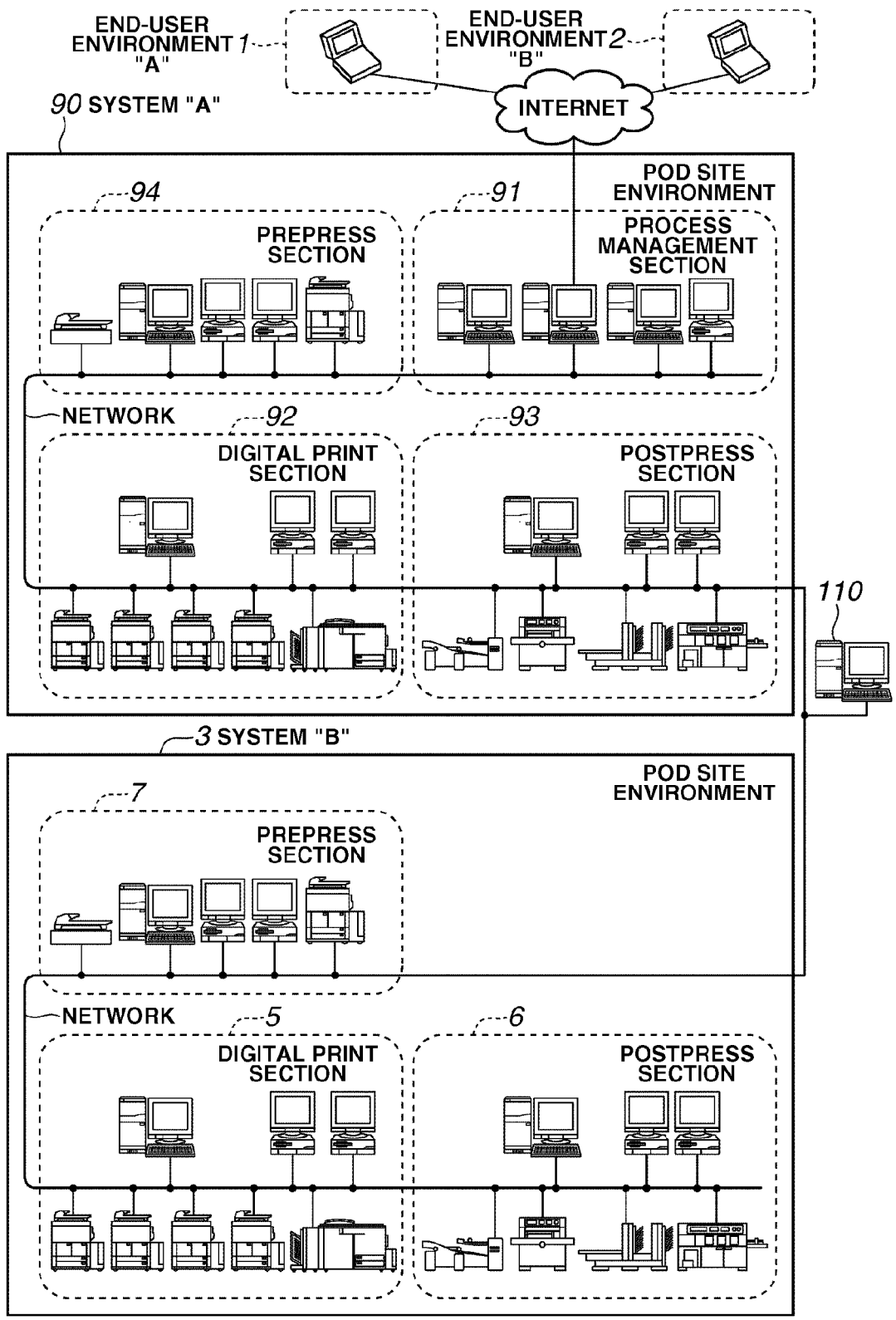
FIG. 33 is a block diagram illustrating a fundamental arrangement of an integrated printing system in accordance with another exemplary embodiment.

FIG. 33 is a block diagram illustrating a fundamental arrangement of an integrated printing system in accordance with another exemplary embodiment, wherein components similar to those illustrated in FIG. 11 are denoted by the same reference numerals.

The integrated printing system shown in FIG. 33 is different from the integrated printing system shown in FIG. 11 in that the process management section 4 is not present in that the system B.

As shown in FIG. 33, the present invention can be realized without using the process management section 4 in the system B.

Similarly, the present invention can be realized without using the prepress section 7 in the system B.

Although not described in the above-described exemplary embodiments, data formats for the PDF and the JDF are opened to the public. The interpretation method and creation method for the PDF and the JDF are also conventionally known.

As described above, the job portal processing section 110 can create, from the original PDF entered in the system A, PDF optimized through the down-sampling and the hairline processing so as to fit to the device resolution of the system B and the RIP processing. Furthermore, the job portal processing section 110 can create, from the original PDF entered in the system A, reduced PDF for the system B so that the page data can be properly disposed within a printable region of the printing device in the system B.

According to the above-described arrangement, when a print job includes PDF optimized through the resolution conversion and the hairline processing for the printing in the system A and transferred from the system A to the system B, the system B can produce a printed product having satisfactory quality.

Furthermore, the job portal processing section 110 can convert the JDF created by the system A into an image processing instruction processible in the system B. Accordingly, if a print job (JDF) received from the system A includes an image processing instruction not processible in the system B or a processing order of instructions unexecutable by the system B, the system B can reduce or eliminate execution errors of the print job.

Furthermore, the job portal processing section 110 can automatically (without requiring manual work) perform transmission/reception and conversion of the above-described print job between two printing systems having different functions.

Thus, a worker is not required to perform a complicated work including confirmation of the contents of each PDF and instructions in each JDF and manual change of the contents. Thus, the entire work efficiency can be improved. As a result, costs for the work can be reduced. Furthermore, failure in the conversion work which may be caused by a confirmation work by a worker can be eliminated. Accordingly, the processing does not stop due to job errors.

Although the above-described exemplary embodiments are arranged to transfer a print job from the system A to the system B via a job portal processing section 110, the system can be modified so that the job can be transferred from the system B to the system A.

Furthermore, the system can be modified in such a manner that the MIS server of each system can possess functions of the job portal processing section 110.

Moreover, the number of printing systems is not limited to only two (i.e., system A and system B). The job portal processing section 110 can perform automatic transmission/reception and conversion of a print job among three or more printing systems having different functions.

The arrangements and contents of the above-described JDF, PDF, and various data (including job processing metadata) are not limited to the above-described exemplary embodiments. It is thus needless to say that various arrangements and contents can be employed according to the purpose of use.

The present invention can be embodied, for example, as a system, an apparatus, a method, a program, or a storage medium. More specifically, the present invention can be applied to a system including two or more devices or can be applied to a single device.

As described above, among plural printing systems having different functions (e.g., between a printing system of company A and a printing system of company B), the job portal processing section 110 can automatically perform transmission/reception and conversion of a print job and realize an automatic connection between plural printing systems.

For example, the job portal processing section 110 can refer to both JDF and PDF transmitted from a printing system of company A and automatically create an optimum JDF for a printing system of company B. Furthermore, the job portal processing section 110 can create optimum PDF for a printing system of company B based on original PDF entered into the printing system of company A.

The job portal processing section 110, when executing the above-described processing, can refer to device function information (i.e., device capability) of the company B system. Thus, the job portal processing section 110 can automatically convert a print job for the printing system of company A into a print job suitable for a printing system of company B.

A memory map shown in FIG. 34 can be referred to as an arrangement of a storage medium capable of storing various data processing programs, which are readable by the job portal processing section 110 (i.e., information processing apparatus) of the integrated printing system according to the present invention.

FIG. 34 illustrates a memory map of a storage medium (recording medium) storing various data processing programs which are executable in the job portal processing section 110 (i.e., information processing apparatus) of the integrated printing system in accordance with an exemplary embodiment.

Although not shown in the drawing, information for managing program groups stored in a storage medium, including version information and creators, can be stored. Furthermore, information depending on an operating system (OS) reading the programs, e.g., icons identifying respective programs, can be also stored.

Furthermore, directories of the above-described storage medium can manage data belonging to various programs. An installation program for various programs and an extraction program for compressed programs can be also stored.

The functions of the processing shown in FIGS. 15, 16, 20, 21, 23, 25, 26, 30, 31 and 32 (refer to steps S74 to S78) of the above-described exemplary embodiments can be realized by installing programs to a host computer. The information including the programs can be supplied to an output apparatus from an external storage medium, using a storage medium (e.g., CD-ROM, flash memory, or FD) or via a network.

Furthermore, software program code for realizing the functions of the above-described exemplary embodiments can be supplied, via a storage medium (or a recording medium), to a system or an apparatus. A computer (or CPU or MPU) in the system or the apparatus can read the program code stored in the storage medium and can execute the readout program.

In this case, the program code read out from the storage medium can realize the functions of the exemplary embodiments. The equivalents of programs can be used if they possess comparable functions. Accordingly, when the functions or processes of the exemplary embodiments are realized by a computer, program code installed in the computer and a recording medium storing the program are used to implement the present invention.

In this case, the type of program can be any one of object code, interpreter program, and OS script data.

A storage medium supplying the program can be selected from any one of a flexible disk, a hard disk, an optical disk, a magneto-optical disk, an MO, a CD-ROM, a CD-R, a CD-RW, a magnetic tape, a nonvolatile memory card, a ROM, and a DVD (DVD-ROM, DVD-R).

In other words, the present invention encompasses a computer program that can realize the functions or processes of the exemplary embodiments or any recording medium that can store the program.

The method for supplying the program includes accessing a web page on the Internet using the browsing function of a client computer, when the web page allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web pages. Namely, the present invention encompasses WWW servers or FTP servers that allow numerous users to download the program files so that the functions or processes of the present invention can be realized on their computers.

Furthermore, enciphering the programs of the present invention and storing the enciphered programs in a CD-ROM or comparable recording medium is a practical method when the programs of the present invention are distributed to the users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiments can be realized.

Furthermore, not only the functions of the above-described exemplary embodiment can be realized by a computer that executes the programs, but also an operating system (OS) running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

The present invention can be applied to a system including plural devices or can be applied to a single apparatus. Moreover, the present invention can be realized by supplying the program(s) to a system or an apparatus. In this case, the system or the apparatus can read the software program relating to the present invention from a storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-348784 filed Dec. 2, 2005, which is hereby incorporated by reference herein in its entirety.

What is claimed is:

1. An information processing apparatus configured to communicate with a first printing system and a second printing system, comprising:
  a reception unit configured to receive, from the first printing system, first work instruction data in which a plurality of works performed in the first printing system are described;
  a acquiring unit configured to obtain device function information in the second printing system;
  a changing unit configured to change processing order of a postpress described in the first work instruction data to an order such that the second printing system can output an ordered final printed material, when it is determined that the first work instruction data includes a work that cannot be performed by the second printing system based on the first work instruction data received from the first printing system and the device function information in the second printing system; and
  a generation unit configured to create second work instruction data for the second printing system indicating that the second printing system performs the postpress described in the first work instruction data in the order changed by said changing unit.

2. The information processing apparatus according to claim 1, wherein the changing unit changes the order to perform stitch processing following cutting processing to the order to perform the cutting processing following the stitch processing when the stitch processing of the first printing system is different from the stitch processing of the second printing system.

3. A method for an information processing apparatus configured to communicate with a first printing system and a second printing system, the method comprising:
  receiving, from the first printing system, first work instruction data in which a plurality of works performed in the first printing system are described;
  obtaining device function information in the second printing system;
  changing processing order of a postpress described in the first work instruction data to an order such that the second printing system can output an ordered final printed material, when it is determined that the first work instruction data includes a work that cannot be performed by the second printing system based on the first work instruction data received from the first printing system and the device function information in the second printing system; and
  creating second work instruction data for the second printing system indicating that the second printing system performs the postpress described in the first work instruction data in the order changed.

4. A method for an information processing apparatus according to claim 3, wherein changing the order to perform stitch processing following cutting processing to the order to perform the cutting processing following the stitch processing when the stitch processing of the first printing system is different from the stitch processing of the second printing system.

5. A non-transitory computer-readable recording medium storing instructions which, when executed by an apparatus configured to communicate with a first printing system and a second printing system, causes the apparatus to perform operations comprising:
  receiving, from the first printing system, first work instruction data in which a plurality of works performed in the first printing system are described;
  obtaining device function information in the second printing system;
  changing processing order of a postpress described in the first work instruction data to an order such that the second printing system can output an ordered final printed material, when it is determined that the first work instruction data includes a work that cannot be performed by the second printing system based on the first work instruction data received from the first printing system and the device function information in the second printing system; and
  creating second work instruction data for the second printing system indicating that the second printing system performs the postpress described in the first work instruction data in the order changed.

6. A non-transitory computer-readable recording medium storing instructions which causes the apparatus to perform operations according to claim 5, wherein changing the order to perform stitch processing following cutting processing to the order to perform the cutting processing following the stitch processing when the stitch processing of the first printing system is different from the stitch processing of the second printing system.

* * * * *